US007770479B2

(12) United States Patent
Hansen et al.

(10) Patent No.: US 7,770,479 B2
(45) Date of Patent: Aug. 10, 2010

(54) SCOTCH YOKE WITH ANTI-LASH ASSEMBLY

(75) Inventors: Craig N. Hansen, Plymouth, MN (US); Paul C. Cross, New Prague, MN (US); Lonnie J. Helgeson, New Prague, MN (US)

(73) Assignee: Electromed, Inc., New Prague, MN (US)

(*) Notice: Subject to any disclaimer, the term of this patent is extended or adjusted under 35 U.S.C. 154(b) by 377 days.

(21) Appl. No.: 11/977,201

(22) Filed: Oct. 25, 2007

(65) Prior Publication Data

US 2008/0092884 A1 Apr. 24, 2008

Related U.S. Application Data

(62) Division of application No. 11/089,862, filed on Mar. 25, 2005, now Pat. No. 7,537,575.

(51) Int. Cl.
*F16C 3/04* (2006.01)

(52) U.S. Cl. .......................... 74/49; 74/570.1; 74/570.3

(58) Field of Classification Search ..................... 74/49, 74/50, 55, 570.1, 570.3; 100/291, 292; 92/138
See application file for complete search history.

(56) References Cited

U.S. PATENT DOCUMENTS

| | | | | |
|---|---|---|---|---|
| 1,898,652 | A | | 2/1933 | Williams |
| 2,588,192 | A | | 3/1952 | Akerman et al. |
| 2,626,601 | A | | 1/1953 | Riley |
| 2,918,917 | A | | 12/1959 | Emerson |
| 3,078,842 | A | | 2/1963 | Gray |
| 4,590,925 | A | | 5/1986 | Dillon |
| 4,761,988 | A | * | 8/1988 | Kato ......................... 72/452.5 |
| 4,838,263 | A | | 6/1989 | Warwick et al. |
| 5,056,505 | A | | 10/1991 | Warwick et al. |
| 5,327,863 | A | * | 7/1994 | Downton et al. ......... 123/197.4 |
| 5,453,081 | A | | 9/1995 | Hansen |
| 5,569,170 | A | | 10/1996 | Hansen |
| 5,769,797 | A | | 6/1998 | Van Brunt et al. |
| 5,769,800 | A | | 6/1998 | Gelfand et al. |
| 5,846,059 | A | * | 12/1998 | Mizuno et al. .............. 417/273 |
| 6,036,662 | A | | 3/2000 | Van Brunt et al. |
| 6,254,556 | B1 | | 7/2001 | Hansen et al. |
| 6,488,641 | B2 | | 12/2002 | Hansen |
| 6,547,749 | B2 | | 4/2003 | Hansen |
| 6,676,614 | B1 | | 1/2004 | Hansen et al. |
| 7,287,458 | B2 | * | 10/2007 | Gao et al. ..................... 92/138 |

* cited by examiner

*Primary Examiner*—William C Joyce
(74) *Attorney, Agent, or Firm*—Richard John Bartz

(57) ABSTRACT

A vest for a human body has an air core coupled to a pulsator operable to subject the vest to pulses of air which applies and releases high frequency pressure forces to the body. The pulsator has two diaphragms connected to a brushless electric dc motor with rotary to reciprocating linear motion transmitting mechanisms comprising scotch yokes having anti-lash assemblies operable to generate air pulses in an air pulsing chamber. The diaphragms also increase the pressure in a manifold chamber. A check valve connects the manifold chamber with a pulsing chamber to allow pressurized air to flow from the manifold chamber into the pulsing chamber. An air flow control valve in communication with the manifold chamber is used to adjust the pressure of the air in the manifold and pulsing chambers. A programmable motor controller adjusts the duration of operation and speed of the motor to vary the operational time and frequency of the air pulses.

14 Claims, 16 Drawing Sheets

SCOTCH YOKE WITH ANTI-LASH ASSEMBLY

CROSS REFERENCE TO RELATED APPLICATION

This application is a division of U.S. application Ser. No. 11/089,862 filed Mar. 25, 2005 now U.S. Pat. No. 7,537,575.

FIELD OF THE INVENTION

The invention is directed to a medical device and method to apply repetitive compression forces to the body of a person to aid blood circulation, loosening and elimination of mucus from the lungs of a person and relieve muscular and nerve tensions.

BACKGROUND OF THE INVENTION

Clearance of mucus from the respiratory tract in healthy individuals is accomplished primarily by the body's normal mucociliary action and cough. Under normal conditions these mechanisms are very efficient. Impairment of the normal mucociliary transport system or hypersecretion of respiratory mucus results in an accumulation of mucus and debris in the lungs and can cause severe medical complications such as hypoxemia, hypercapnia, chronic bronchitis and pneumonia. These complications can result in a diminished quality of life or even become a cause of death. Abnormal respiratory mucus clearance is a manifestation of many medical conditions such as pertussis, cystic fibrosis, atelectasis, bronchiectasis, cavitating lung disease, vitamin A deficiency, chronic obstructive pulmonary disease, asthma, and immotile cilia syndrome. Exposure to cigarette smoke, air pollutants and viral infections also adversely affect mucociliary function. Post surgical patients, paralyzed persons, and newborns with respiratory distress syndrome also exhibit reduced mucociliary transport.

Chest physiotherapy has had a long history of clinical efficacy and is typically a part of standard medical regimens to enhance respiratory mucus transport. Chest physiotherapy can include mechanical manipulation of the chest, postural drainage with vibration, directed cough, active cycle of breathing and autogenic drainage. External manipulation of the chest and respiratory behavioral training are accepted practices as defined by the American Association for Respiratory Care Guidelines, 1991. The various methods of chest physiotherapy to enhance mucus clearance are frequently combined for optimal efficacy and are prescriptively individualized for each patient by the attending physician.

Cystic fibrosis (CF) is the most common inherited life-threatening genetic disease among Caucasians. The genetic defect disrupts chloride transfer in and out of cells, causing the normal mucus from the exocrine glands to become very thick and sticky, eventually blocking ducts of the glands in the pancreas, lungs and liver. Disruption of the pancreatic glands prevents secretion of important digestive enzymes and causes intestinal problems that can lead to malnutrition. In addition, the thick mucus accumulates in the lung's respiratory tracts, causing chronic infections, scarring, and decreased vital capacity. Normal coughing is not sufficient to dislodge these mucus deposits. CF usually appears during the first 10 years of life, often in infancy. Until recently, children with CF were not expected to live into their teens. However, with advances in digestive enzyme supplementation, anti-inflammatory therapy, chest physical therapy, and antibiotics, the median life expectancy has increased to 30 years with some patients living into their 50's and beyond. CF is inherited through a recessive gene, meaning that if both parents carry the gene, there is a 25 percent chance that an offspring will have the disease, a 50 percent chance they will be a carrier and a 25 percent chance they will be genetically unaffected. Some individuals who inherit mutated genes from both parents do not develop the disease. The normal progression of CF includes gastrointestinal problems, failure to thrive, repeated and multiple lung infections, and death due to respiratory insufficiency. While some patients experience grave gastrointestinal symptoms, the majority of CF patients (90 percent) ultimately succumb to respiratory problems.

A demanding daily regimen is required to maintain the CF patient's health, even when the patient is not experiencing acute problems. A CF patient's CF daily treatments may include:

- Respiratory therapy to loosen and mobilize mucus;
- Inhalation therapy with anti-inflammatory drugs, bronchodilators and antibiotics for infections;
- Oral and intravenous antibiotics to control infection;
- Doses of Pulmozyme to thin respiratory mucus;
- 20 to 30 pancreatic enzyme pills taken with every meal to aid digestion;
- a low-fat, high-protein diet;
- Vitamins and nutritional supplements; and
- Exercise.

A lung transplant may be the only hope for patients with end stage cystic fibrosis.

Virtually all patients with CF require respiratory therapy as a daily part of their care regimen. The buildup of thick, sticky mucus in the lungs clogs airways and traps bacteria, providing an ideal environment for respiratory infections and chronic inflammation. This inflammation causes permanent scarring of the lung tissue, reducing the capacity of the lungs to absorb oxygen and, ultimately, sustain life. Respiratory therapy must be performed, even when the patient is feeling well, to prevent infections and maintain vital capacity. Traditionally, care providers perform Chest Physical Therapy (CPT) one to four times per day. CPT consists of a patient lying in one of twelve positions while a caregiver "claps" or pounds on the chest and back over each lobe of the lung. To treat all areas of the lung in all twelve positions requires pounding for half to three-quarters of an hour along with inhalation therapy. CPT clears the mucus by shaking loose airway secretions through chest percussions and draining the loosened mucus toward the mouth. Active coughing is required to ultimately remove the loosened mucus. CPT requires the assistance of a caregiver, often a family member but a nurse or respiratory therapist if one is not available. It is a physically exhausting process for both the CF patient and the caregiver. Patient and caregiver non-compliance with prescribed protocols is a well-recognized problem that renders this method ineffective. CPT effectiveness is also highly technique sensitive and degrades as the giver becomes tired. The requirement that a second person be available to perform the therapy severely limits the independence of the CF patient.

Artificial respiration devices for applying and relieving pressure on the chest of a person have been used to assist in lung breathing functions, and loosening and eliminating mucus from the lungs of CF persons. Subjecting the person's chest and lungs to pressure pulses or vibrations decreases the viscosity of lung and air passage mucus, thereby enhancing fluid mobility and removal from the lungs. These devices use vests having air-accommodating bladders that surround the chests of persons. Mechanical mechanisms, such as solenoid or motor-operated air valves, bellows and pistons are disclosed in the prior art to supply air under pressure to diaphragms and bladders in regular pattern or pulses. Manually operated controls are used to adjust the pressure of the air and air pulse frequency for each patient treatment and during the treatment. The bladder worn around the thorax of the CF person repeatedly compresses and releases the thorax at frequencies as high as 25 cycles per second. Each compression produces a rush of air through the lobes of the lungs that shears the secretions from the sides of the airways and propels them toward the mouth where they can be removed by normal coughing. External chest manipulation with high frequency chest wall oscillation was reported in 1966. Beck G J. *Chronic Bronchial Asthma and Emphysema. Rehabilitation and Use of Thoracic Vibrocompression, Geriatrics* (1966); 21: 139-158.

G. A. Williams in U.S. Pat. No. 1,898,652 discloses an air pulsator for stimulating blood circulation and treatment of tissues and muscles beneath the skin. A reciprocating piston is used to generate air pressure pulses which are transferred through a hose to an applicator having a flexible diaphragm. The pulsating air generated by the moving piston imparts relatively rapid movement to the diaphragm which subjects the person's body to pulsing forces.

J. D. Ackerman et al in U.S. Pat. No. 2,588,192 disclose an artificial respiration apparatus having a chest vest supplied with air under pressure with an air pump. Solenoid-operated valves control the flow of air into and out of the vest in a controlled manner to pulsate the vest, thereby subjecting the person's chest to repeated pressure pulses.

J. H. Emerson in U.S. Pat. No. 2,918,917 discloses an apparatus for exercising and massaging the airway and associated organs and loosening and removing mucus therefrom. A blower driven with a motor creates air pressure for a device that fits over a person's nose and mouth. A diaphragm reciprocated with an electric motor pulses the air flowing to the device and the person's airway. The speed of the motor is controlled to regulate the number of vibrations per minute.

R. F. Gray in U.S. Pat. No. 3,078,842 discloses a bladder for cyclically applying an external pressure to the chest of a person. A pressure alternator applies air pressure to the bladder. A pulse generator applies air pressure to the bladder to apply pressure pulses to the chest of the person.

R. S. Dillion in U.S. Pat. No. 4,590,925 uses an inflatable enclosure to cover a portion of a person's extremity, such as an arm or leg. The enclosure is connected to a fluid control and pulse monitor operable to selectively apply and remove pressure on the person's extremity.

W. J. Warwick and L. G. Hansen in U.S. Pat. Nos. 4,838,263 and 5,056,505 disclose a chest compression apparatus having a chest vest surrounding a person's chest. A motor-driven rotary valve allows air to flow into the vest and vent air therefrom to apply pressurized pulses to the person's chest. An alternative pulse pumping system has a pair of bellows connected to a crankshaft with rods operated with a dc electric motor. The speed of the motor is regulated with a controller to control the frequency of the pressure pulses applied to the vest. The patient controls the pressure of the air in the vest by opening and closing the end of an air vent tube.

C. N. Hansen in U.S. Pat. Nos. 5,453,081 and 5,569,170 discloses an air pulsating apparatus for supplying pulses of air to an enclosed receiver, such as a vest located around a person's chest. The apparatus has a casing with an internal chamber containing a diaphragm. An electric operated device connected to the diaphragm is operated with a pulse generator to vibrate the diaphragm to pulse the air in the chamber. A hose connects the chamber with the vest to transfer air and air pulses to the vest which applies pressure pulses to the person's chest.

N. P. Van Brunt and D. J. Gagne in U.S. Pat. Nos. 5,769,797 and 6,036,662 disclose an oscillatory chest compression device having a wall with an air chamber and a diaphragm mounted on the wall and exposed to the air chamber. A rod pivotally connected to the diaphragm and rotatably connected to a crankshaft transmits force to the diaphragm during rotation of the crankshaft. An electric motor drives the crankshaft at selected controlled speeds to regulate the frequency of the air pulses generated by the moving diaphragm. An air flow generator, shown as a blower, delivers air to the air chamber to maintain the pressure of the air in the chamber. Controls for the motors that move the diaphragm and rotate the blower are responsive to the air pressure pulses and pressure of the air in the air chamber. These controls have air pulse and air pressure responsive feedback systems that regulate the operating speeds of the motors to control the pulse frequency and air pressure in the vest.

C. N. Hansen in U.S. Pat. No. 6,488,641 discloses a pulsator operable to generate repetitive air pressure pulses used to apply pressure pulses to a human body. The pulsator has a scotch yoke motion transmitting mechanism for reciprocating diaphragms to generate repetitive air pressure pulses. A manually adjusted analog control coupled to a brush electric motor is used to control the speed of the motor and reciprocating frequency of the diaphragms. The control must be manually adjusted for each use and different users of the pulsator according to a prescribed or desired treatment. Manual adjustments of the speed of the motor to change the frequency of the pressure pulses can be made during use of the pulsator.

C. N. Hansen in U.S. Pat. No. 6,547,749 discloses a pulsator having two diaphragms connected to scotch yokes which transmits rotary motion of a brush dc electric motor to reciprocating motions of the diaphragm to generate air pressure and air pulses. The scotch yokes are subject to surface wear due to prolonged strains and friction resulting in vibrations and noise. A first manually operated control is used to select the frequency of the air pulses by controlling the speed of the motor. A second manually operated control is used to adjust the pressure of the air generated by the pulsator. These controls must be manually adjusted for each use and during use of the pulsator according to a prescribed or described treatment. The controls have manually turned knobs to adjust the pulse frequency and air pressure generated by the pulsator. The user must remember the frequency and previous air pressure or have written instructions for these settings for consistent treatment.

SUMMARY OF THE INVENTION

The invention is a medical device used to deliver high-frequency chest wall oscillations to promote airway clearance and improve bronchial drainage in humans. The primary components of the device include an air-pulse generator, an air inflatable vest, and a flexible hose coupling the generator to the vest for transmitting air pressure and pressure pulses from the generator to the vest. The vest includes an air core or bladder connected with the hose to the generator. Air pressure pulses subjected to the air core create repetitive high frequency pressure pulses that are transmitted to the thorax of a person wearing the vest whereby high frequency chest wall oscillations enhance mucus clearance in the person's respiratory system. The air pressure pulses are established with movable diaphragms located between air pumping chambers and an air pulsing chamber. Scotch yoke motion transmitting mechanisms change rotatory motion from a brushless dc electric motor to reciprocating movements of the diaphragms.

The reciprocating diaphragms pump air to increase air pressure and pulse the air by increasing and decreasing air pressure in a chamber in communication with the hose. Each scotch yoke motion transmitting mechanism includes a yoke secured directly to a diaphragm, a shuttle slidably mounted on the yoke and an eccentric on a shaft rotatably mounted in the shuttle. An anti-lash assembly has a lash plate biased against the shuttle to compensate for manufacturing tolerances, thermal growth, and wear of the shuttle and yoke, to reduce stress and impact forces and inhibit vibrations and noise. The anti-lash assembly has a lash plate biased with springs into continuous engagement with the shuttle. A guide pin mounted on the yoke maintains the lash plate aligned with the shuttle. The power supply for the brushless dc motor includes a digital frequency control component that also controls the time or duration of operation of the device. The control component has memory microchips that store time and frequency data for ease and reliable use. A control panel has a screen having manual display coupled to time and frequency keys which are manually operated to change the time and frequency programs or change manual time and frequency operation of the device. The air pressure in the vest is regulated with an adjustable air flow restrictor that limits the flow of air into an air pumping chamber thereby controlling the pressure of the air in the air pumping chamber, air pulsating chamber and bladder of the vest.

The preferred embodiment of the body pulsating apparatus has a case with walls surrounding an air pulsing chamber. An elongated hose carries air and air pulses to an air core in a vest located about the upper body of a person. The case has an internal wall that separates the air pulsing chamber from an air manifold chamber. One or more one-way valves mounted on the internal wall allow air to flow from the air manifold chamber into the air pulsing chamber and prevent reverse flow of air back from the air pulsing chamber into the air manifold chamber. The case has top and bottom openings covered with diaphragms attached with flexible peripheral members to the case to enclose the air pulsing chamber. Located within the air pulsing chamber is a pair of linear reciprocating motion transmitting mechanisms for linearly moving the diaphragms in straight line opposite directions to pulse the air in the air pulsing chamber. The motion transmitting mechanisms are scotch yokes which provide the diaphragms with straight line harmonic motions. An electric brushless dc motor rotates a common shaft having a pair of eccentrics that laterally moves shuttles with respect to the yokes, and reciprocates yokes with respect to the yoke guides. The yokes are fixed directly to the diaphragms. Each scotch yoke includes an anti-lash assembly to compensate for wear of the shuttle and yoke, allow for thermal growth and relaxed manufacturing tolerances, and prevent movement of the shuttle normal to its lateral movements relative to the yoke to reduce stress and impact forces on the shuttle and inhibits vibrations and noise. The anti-lash assembly has a flat lash plate located in surface engagement with the top surface of the shuttle. A pair of compression coil springs mounted on the yoke bias the lash plate against the shuttle. A cylindrical guide pin fixed to the yoke extends into a hole in the lash plate to maintain the lash plate aligned with the shuttle and allow the lash plate to compensate for wear of the shuttle, yoke and lash plate. The operating speed of the motor is controlled with a motor controller wired to a screen and time and frequency adjusting keys. The controller is programmable to change the speed of the motor which is proportional to air pulse frequency in the air pulsing chamber. Covers located over the diaphragms attached to the casing have air pumping chambers in communication with the manifold chamber. The inward reciprocating movements of the diaphragms draws air through an air flow control into air manifold chamber and pumping chambers and the outward reciprocating movement of the diaphragms then compresses the air in the air manifold chamber and pumping chambers. The pressure of the air in the air manifold chamber is regulated with a manually adjustable air flow control valve. Restricting the flow of air into the manifold chamber reduces the pressure of the air in the air manifold chamber. When the pressure of the air in the air manifold chamber exceeds the air pressure in the air pulsing chamber, the one-way valve opens to allow air to flow into the air pulsing chamber. The reciprocating movements of the diaphragms pulse the pressurized air at a frequency determined by the speed of the electric brushless dc motor that drives the scotch yokes.

DESCRIPTION OF PREFERRED EMBODIMENT

Figure 1:
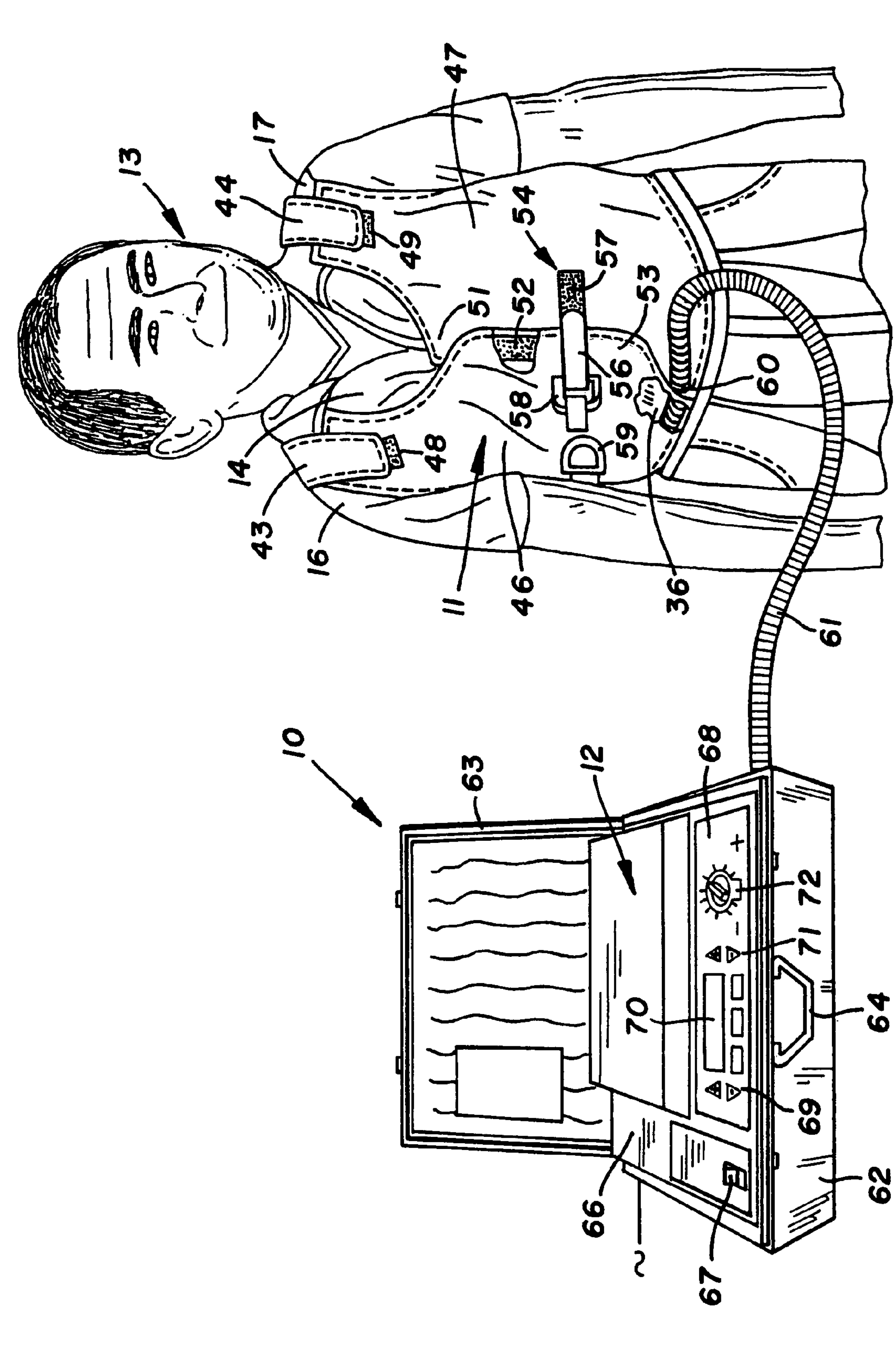
FIG. 1 is a diagrammatic view of the air pressure and pulse generator of the invention coupled to an air core located in a vest located around the thorax of a person.
Figure 3:
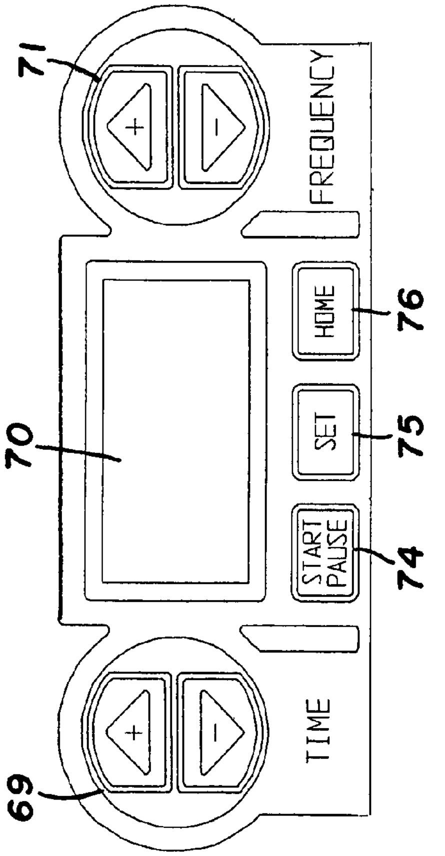
FIG. 3 is a top plan view of the time and frequency control panel of the air pressure and pulse generator of FIG. 1.

The body pulsating apparatus, indicated generally at 10 in FIG. 1, has a vest 11 and an air pressure and pulse generator 12 operable to apply repetitive pressure pulses to the vest located about a human body to provide secretion and mucus clearance therapy. Respiratory mucus clearance is applicable to many medical conditions, such as pertussis, cystic fibrosis, atelectasis, bronchiectasis, cavitating lung disease, vitamin A deficiency, chronic obstructive pulmonary disease, asthma, and immobile cilia syndrome. Post surgical patients, paralyzed persons, and newborns with respiratory distress syndrome have reduced mucociliary transport. Apparatus 10 provides high frequency chest wall oscillations or pulses to enhance mucus and airway clearance in a person 13 with reduced mucociliary transport.

Figure 2:
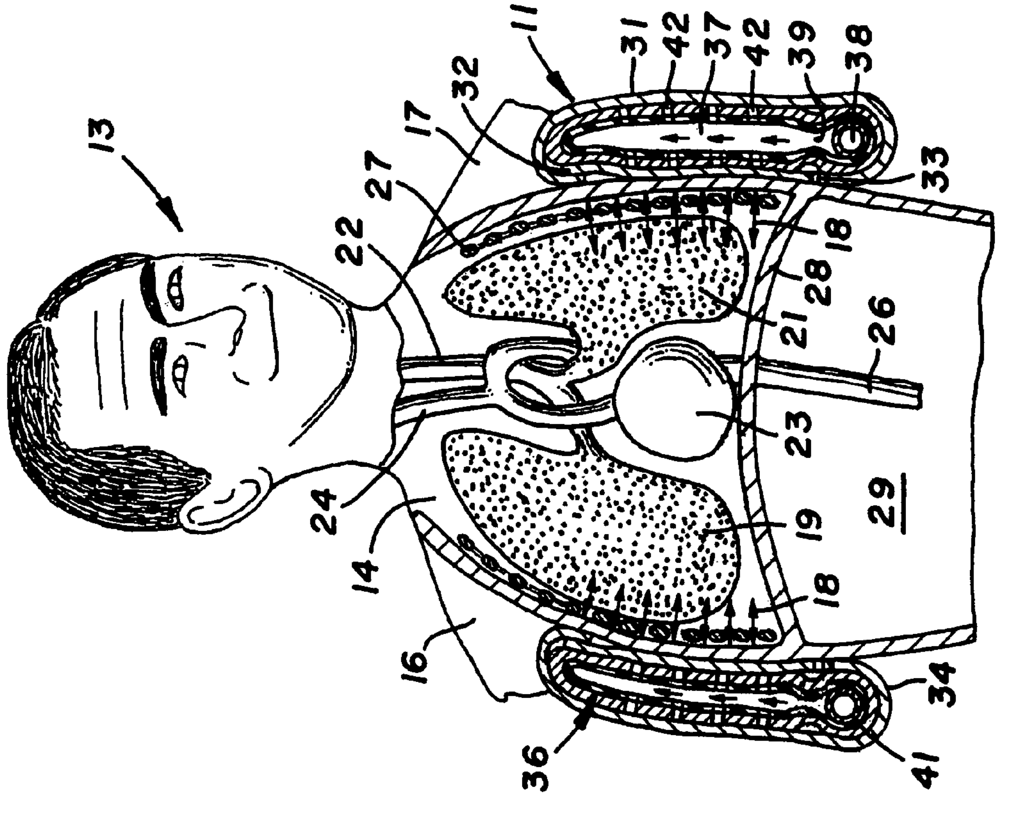
FIG. 2 is a diagrammatic view, partly sectioned, of the air core, vest, and person of FIG. 1.

Vest 11 located around the person's upper body or thorax 14 is supported on the person's shoulders 16 and 17. As shown in FIG. 2, vest 11 expanded into substantial surface contact with the exterior of upper body 14 functions to apply repeated compression or pressure pulses, shown by arrows 18 to body 14. The reaction of body 14 to the pressure pulses causes repetitive expansion of the body when the pressure pulses are in the low pressure phase of the pressure cycle. The pressure pulses subjected to lungs 19 and 21 and trachea 22 provide secretions and mucus clearance therapy. The thoracic cavity occupies only the upper part of the thoracic cage and contains right and left lungs 19 and 21, heart 23, arteries 24 and 26, and rib cage 27. The repeated pressure pulses applied to thorax 14 stimulates heart 23 and blood flow in arteries 24 and 26 and veins in the chest cavity. Muscular and nerve tensions are also relieved by the repetitive pressure pulses imparted to the front, sides, and back portions of thorax 14. The lower part of the thoracic cage comprises the abdominal cavity 29 which reaches upward as high as the lower tip of the sternum so as to afford considerable protection to the large and easily injured abdominal organs, such as the liver, spleen, stomach, and kidneys. The two cavities are separated by a dome-shaped diaphragm 28. Rib cage 27 has twelve ribs on each side of the trunk. The ribs consist of a series of thin, curved, rather elastic bones which articulate posteriorly with the thoracic vertebrae. The spaces between successive ribs are bridged by intercostal muscles. The rib cage 29 aids in the distribution of the pressure pulses to the lungs 19 and 21 and trachea 22.

Vest 11 has an outside cover 31 comprising a non-elastic material, such as a nylon fabric. Other types of materials can be used for cover 31. Cover 31 is secured to a flexible inside liner 32 located adjacent and around body 14. Liner 32 is a flexible fabric, such as a porous cotton fabric, that allows air to flow through the fabric toward body 14. A closure device 33, shown as a zipper, secures the bottom of liner 32 to an upwardly directed end portion 34 of cover 31. An air core or bladder 36 having internal chamber 37 and a manifold passage 38 is located between cover 31 and liner 32. A plurality of air passages 39 between passage 38 and chamber 37 allow air to flow upwardly into chamber 37. An elongated coil spring 41 in the lower portion of air core 36 inside manifold passage 38 maintains the manifold passage 38 open. Other types of structures that maintain manifold passage 38 open and allow air to flow through passage 38 can be used in the lower portion of air core 36. The end portion 33 of non-elastic cover 31 and coil spring 41 substantially reduces the inward pressure of the vest on the abdominal cavity 29 and organs therein and reduces stress on the digestive system. Air core 36 has a plurality of vertically aligned air flow control apertures 42 that restrict the flow of air from air core chamber 37 into the space between cover 31 and liner 32. The air flowing through porous liner 32 ventilates and cools body 14 surrounded by vest 11.

Returning to FIG. 1, vest 11 has a pair of upright shoulder straps 43 and 44 laterally separated with a concave upper back edge. Upright front chest portions 46 and 47 are separated from straps 43 and 44 with concave curved upper edges which allow vest 11 to fit under the person's arms. Releasable fasteners, such as loop pads 48 and 49, secured to the outer surfaces of chest portions 46 and 47 cooperate with hook pads (not shown) secured to the insides of shoulder straps 43 and 44 to releasably connect shoulder straps 43 and 44 to chest portions 46 and 47. Shoulder straps 43 and 44 extend forwardly over shoulders 16 and 17 and downwardly over chest portions 46 and 47. The hook and loop pads are releasable VELCRO fasteners that connect shoulder straps 43 and 44 to chest portions 46 and 47 and hold chest portions 46 and 47 adjacent the front of body 14.

Vest 11 has a first lateral end flap 51 extended outwardly at the left side of the vest. A rectangular loop pad 52 secured to the outside of the end flap 51 cooperates with hook pads on a second lateral end flap 53 on the right side of vest 11 to hold vest 11 around body 14. The hook and loop pads are VELCRO fasteners that allow vest 11 to be tightly wrapped around body 14.

As shown in FIG. 1, a releasable retainer 54 connected to the vest end flaps hold the flaps 51 and 53 in over lapped positions and prevents the releasable hook and loop fasteners 52 from disengaging during the application of repetitive pulse to the body 14 on the person 13. Retainer 54 comprises an elongated strap 56 secured at one end thereof to chest portion 53. Opposite ends of strap 56 have hook and loop releasable fasteners 57 that allow strap 56 to be fastened into a D-ring. A pair of D-rings 58 and 59 attached to chest portion 46 are aligned with strap 56. Strap 56 is looped through D-ring 58 and connected with fasteners 57 to hold the vest end flaps 51 and 53 and vest 11 around the body 14 of the person. The free end of strap 56 can be quickly pulled to release fasteners 57 and disengage retainer 54. C. N. Hansen and L. J. Helgeson in U.S. Pat. No. 6,676,614 disclose a vest operable to subject a person's thorax to pressure pulses.

In use, vest 11 is placed about the person's body 14, as shown in FIG. 1, and held in place with shoulder straps 43 and 44. Releasable fasteners 48 and 49 secure straps 43 and 44 to chest portions 46 and 47. The vertical location of vest 11 on body 14 is adjusted by changing the connection relationship of straps 43 and 44 on releasable fasteners 48 and 49. The circumferential location of vest 11 is maintained in a light fit around the person's body 13 with releasable fasteners 52. Retainer 54 maintains fasteners 52 in engagement with each other and prevents disengagement during the pulsating of vest 11. Strap 56 of retainer 54 is looped through one of the D-rings 58, 59 and attached together with hook and loop fasteners 57. Air pulsator 12 is then connected with hose 61 to tube 62 at and end of to apply repetitive pressure pulses to body 14 of person 13.

Air pressure and pulse generator 12 is mounted in a case 62 having an open top and a cover 63 hinged to case 62 operable to close case 62. A handle 64 pivotally mounted on case 62 is used as a hand grip to facilitate transport of generator 12. Case 62 and cover 63 have overall dimensions that allow the case to be an aircraft carryon item.

Air pressure and pulse generator 12 has a top member 66 mounted on case 62 enclosing the operating elements of the generator. Top member 66 is not readily removable from case 62 to prohibit unauthorized adjustments and repairs of the operating components of the air pressure and pulse generator

Figure 4:
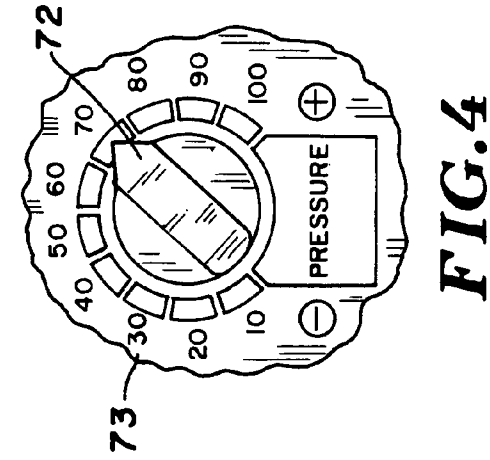
FIG. 4 is a top plan view of the air pressure manual control of the air pressure and pulse generator of FIG. 1.

12. Top member 67 supports a main electric power switch 67 and a front panel 68 having time control keys 69, an information display screen 70, frequency control keys 71 and an air pressure manual control knob 72. Time control keys 69 are electronic switches comprising an upper+key and a lower key to selectively program an increase or decrease of a treatment cycle between 0 to 30 minutes. The selected time period is registered on screen 70. Screen 70 is an electronic viewing display device, such as a liquid crystal display or a light-emitting organic material display. Frequency control keys 71 are electronic switches comprising an upper+key and a lower key to selectively program an increase or decrease of the pulse frequency between 5 and 25 cycles per second or Hz. As shown in FIG. 1, time control key 69, information display screen 70, frequency control key 71 and air pressure control knob 72 are located on front panel 68 for user friendly convenience and use. The adjustment of the air pressure in air core 36 is controlled by manually turning knob 72. The average air pressure in air core 36 is controlled between atmosphere pressure and one psi, as shown in FIG. 4 by pressure scale 73 with numbers 10 to 100. The oscillating pressure pulses cycle above and below the selected average pressure.

Figure 8:
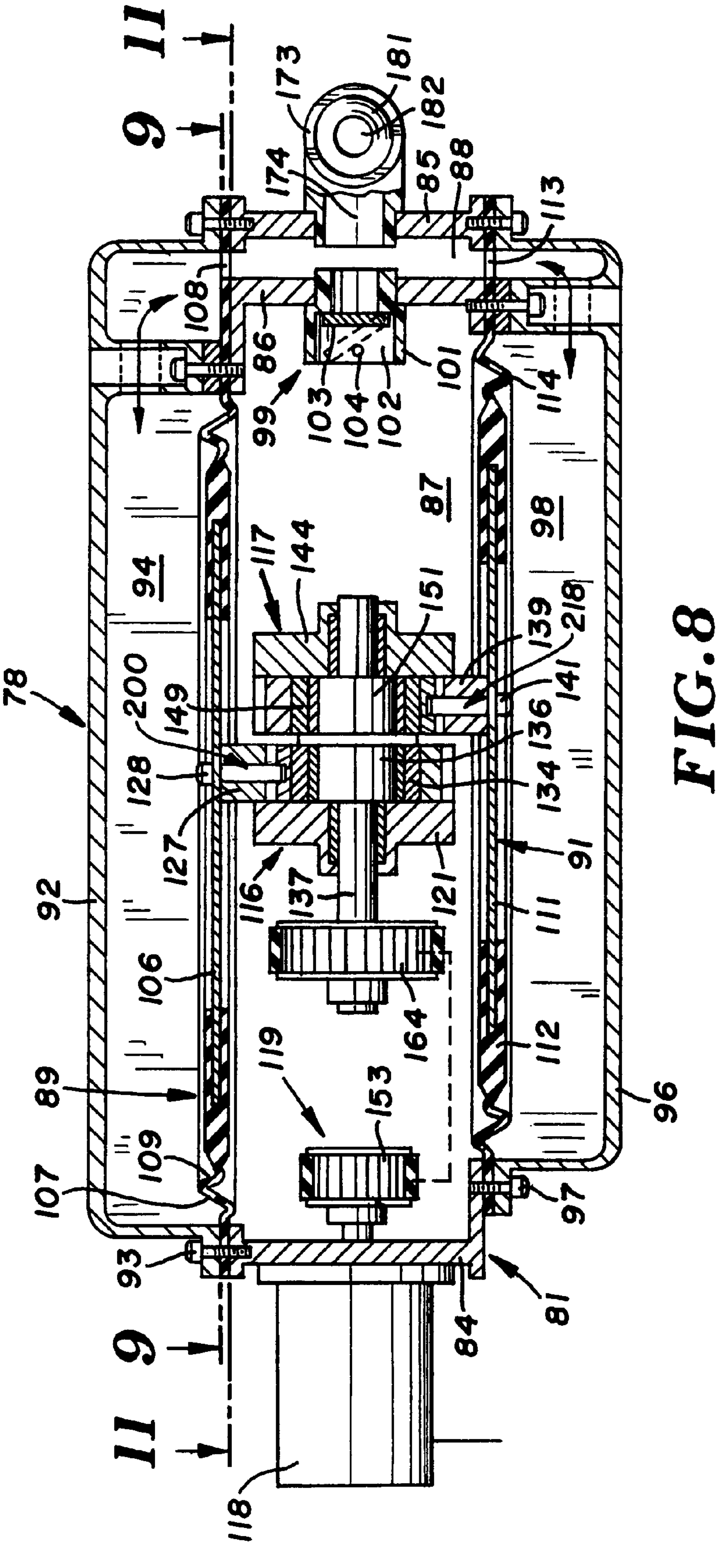
FIG. 8 is an enlarged sectional view taken along line 8-8 of FIG. 5.
Figure 9:
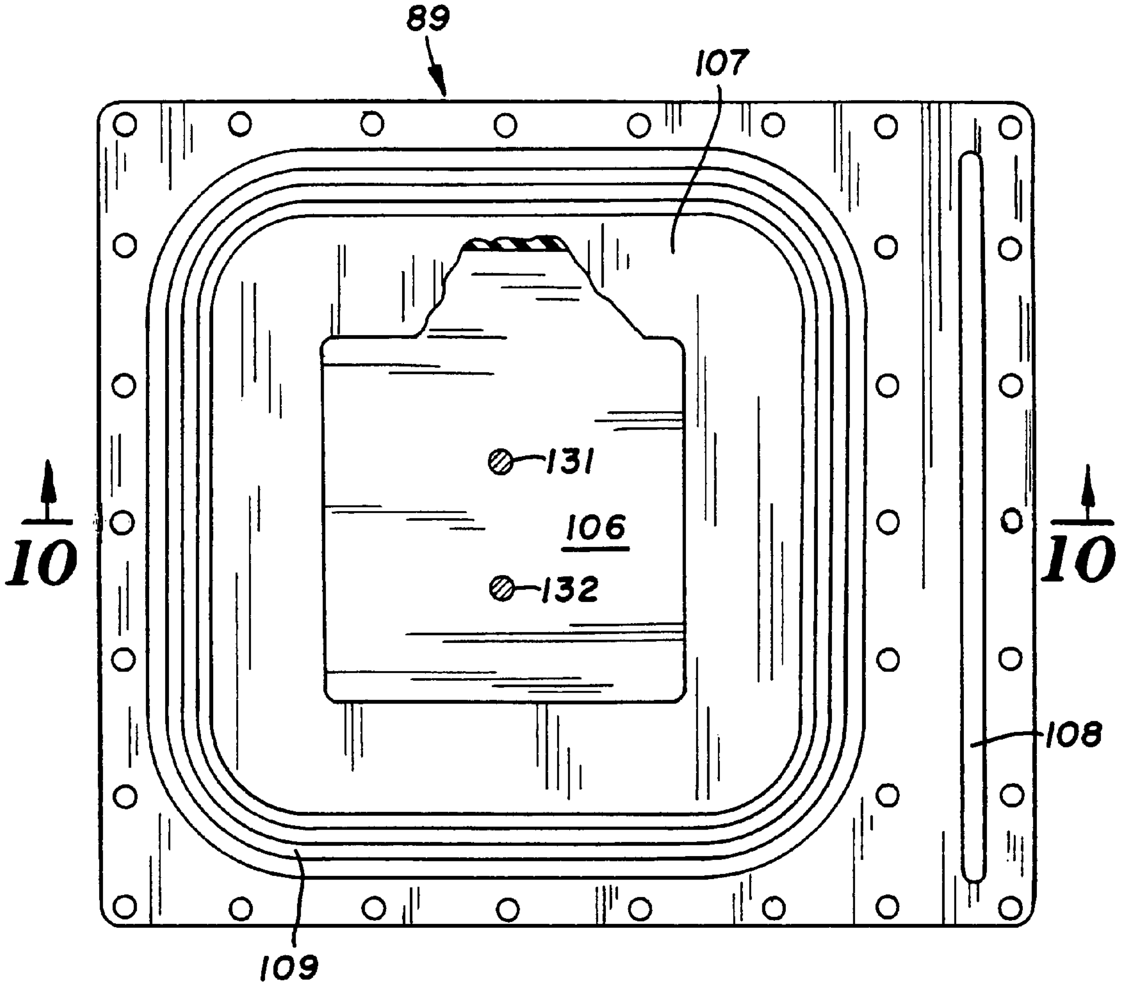
FIG. 9 is a sectional view taken along line 9-9 of FIG. 8.
Figure 10:
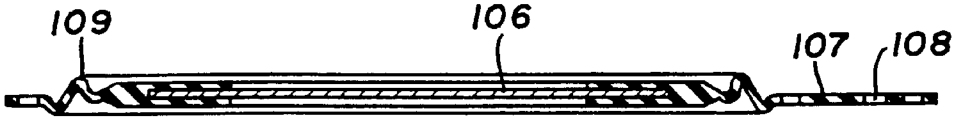
FIG. 10 is a sectional view taken along line 10-10 of FIG. 9.

As shown in FIGS. 5, 6, 7 and 11, air pressure and air pulse generator 12 has a combined air pulsator and pump unit 78 operable to create air pressure pulses, shown by arrows 79, which are transported by hose 61 to air core 36. Unit 78 has a rectangular case 81 having upright side walls 82 and 83 joined to end walls 84 and 85. An internal wall 86 extended between and joined to side walls 82 and 83 separates an air pulsing chamber 87 from a manifold or vestibule chamber 88. Manifold chamber 88 is between end wall 85 and inside wall 86. The top and bottom of casing 81 is open. A pair of diaphragms 89 and 91 mounted on casing 81 close the casing openings to enclose the air pulsing chamber 87 located between diaphragms 89 and 91. A first pan-shaped cover 92 secured to the top of case 81 with fasteners 93 is located outwardly of diaphragm 89. The space between cover 92 and diaphragm 89 is a first pumping chamber 94 in fluid communication with manifold chamber 88 to allow air to flow into and out of chamber 94. A second pan-shaped cover 96 secured to the bottom of case 81 with fasteners 97 is located outwardly from diaphragm 91. The space between cover 96 and diaphragm 91 is a second air pumping chamber 98 in fluid communication with the manifold chamber 88 to allow air to flow between chambers 88 and 98. Air flows from pumping chambers 94 and 98 into manifold chamber 88 and from manifold chamber 88 into pulsing chamber 87 through a one-way valve or check valve 99, shown by arrow 100 in FIG. 14. Valve 99 when closed, as shown in FIG. 8, prevents the flow of air from pulsing chamber 87 back to manifold chamber 88. Valve 99, shown in FIG. 8, has a cylindrical housing 101 mounted on wall 86. Housing 101 has a passage 102 open to chambers 87 and 88 accommodating a valving member or disk 103 movable between open and closed positions. A transverse pin 104 mounted on housing 101 retains disk 103 in passage 102 and provides a fulcrum for disk 103 to allow disk 103 to pivot to its open position. One or more one-way valves mounted on wall 86 can be used to permit air to flow from manifold chamber into pulsating chamber 87 and block reverse flow of air from pulsating chamber 87 back to manifold chamber 88.

Diaphragm 89 has a rectangular rigid metal plate 106 joined to a peripheral flexible flange 107 of rubber or plastic. The inner portion of flange 107 is bifurcated and bonded to opposite sides of plate 106. The outer portion of flange 107 is clamped with fasteners 93 between cover 92 and casing 81. As shown in FIGS. 8, 9, 14 and 15, flange 107 has an opening 108 allowing air to flow between first pumping chamber 94 and manifold chamber 88. Flexible flange 107 has a flexible convolution fold section 109 comprising upward and downward directed ribs that allow linear lateral movement of plate 106 without stretching and stressing the flexible material of flange 107. Diaphragm 91 has a rigid metal plate 11 located on the bottom side of chamber 87 and parallel to plate 106. A flexible flange 112 joined to plate 106 is clamped with fasteners 97 between casing 81 and cover 96. Flange 112 has an opening 113 allowing air to flow between manifold chamber 88 and second pumping chamber 98. A middle section of flange 112 around plate 111 has a flexible convolution fold section that allows linear lateral movement of plate 111 without stretching and stressing the flexible material of flange 112.

Figure 11:
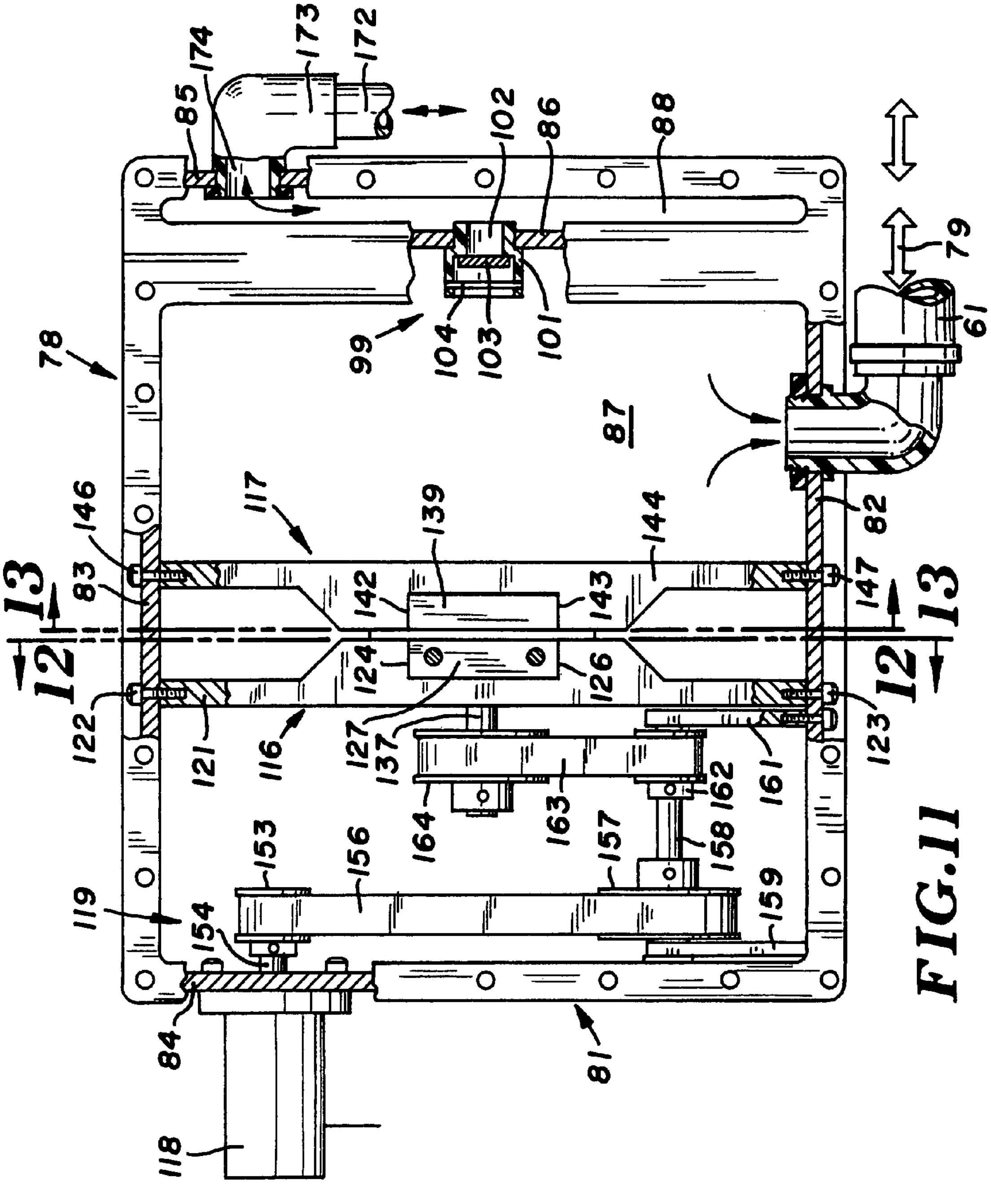
FIG. 11 is a sectional view taken along line 11-11 of FIG. 8.
Figure 13:
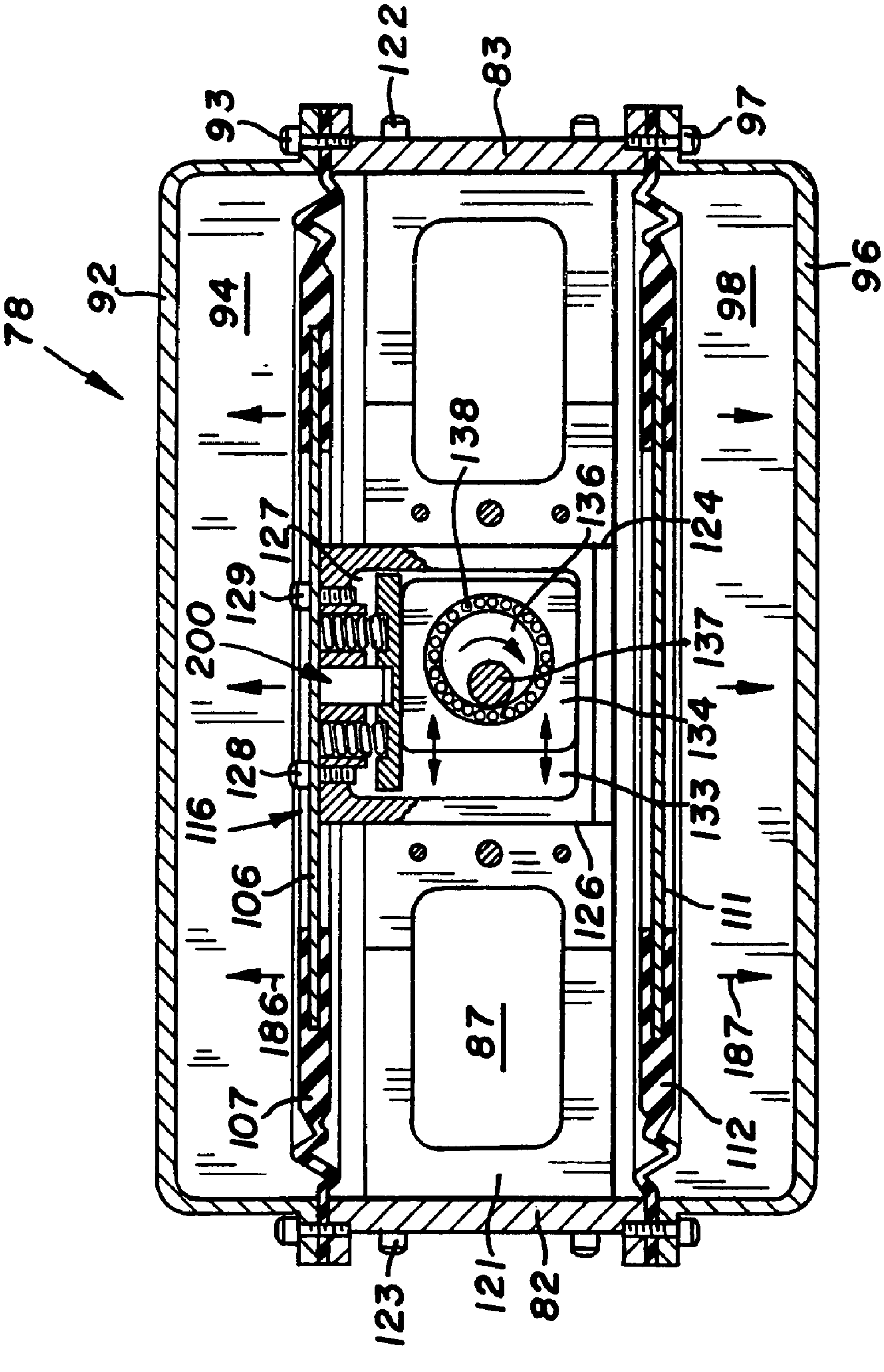
FIG. 13 is a sectional view taken along line 13-13 of FIG. 11.

Diaphragms 89 and 91 are linearly moved in opposite lateral directions with linear motion transmission assemblies indicated generally at 116 and 117 driven with a variable speed brushless dc electric motor 118. A belt and pulley power transmission 119 driveably connects motor 118 to motion transmission assemblies 116 and 117. As shown in FIGS. 11 and 13, motion transmission assembly 116 has a cross member 121 secured with fasteners 122 and 123 to casing side walls 82 and 83. Member 121 has a pair of parallel upright guide surfaces 124 and 126. A yoke 127 having opposite sides located in sliding engagement with guide surfaces 124 and 126 is secured to plate 106 with a pair of bolts 128 and 129. Bolts 128 and 129 extended through holes 131 and 132 in plate 107 prevent relative movement, including pivotal movement, between yoke 127 and plate 106. Yoke 127 has only linear reciprocating movement which prevents rocking and angular movement of diaphragm 89 during reciprocation thereof. As seen in FIG. 13, yoke 127 has a lateral opening or window 133 accommodating a slide block or shuttle 134. Shuttle 134 has a bore accommodating an eccentric 136 mounted on a shaft 137. Eccentric 136 is surrounded with a roller bearing 138 located in the bore of shuttle 134. Yoke 127, shuttle 134, eccentric 136 and shaft 137 are known as a scotch yoke power transmission assembly.

Figure 16:
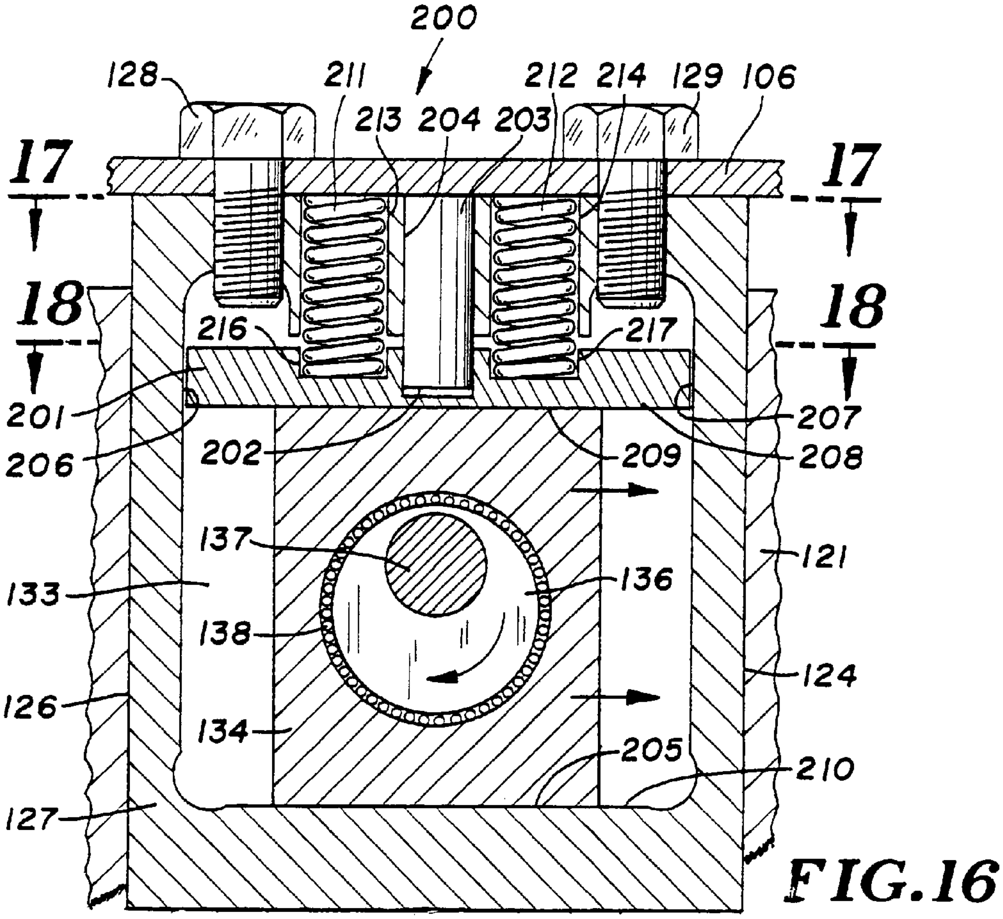
FIG. 16 is an enlarged sectional view of the scotch yoke mechanism taken along the line 16-16 of FIG. 15.
Figure 17:
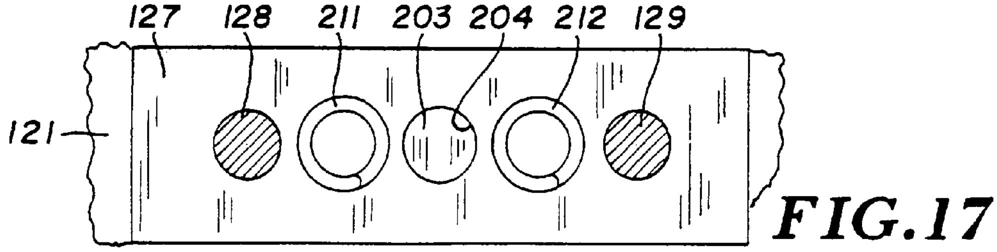
FIG. 17 is a sectional view taken along line 17-17 of FIG. 16.
Figure 18:
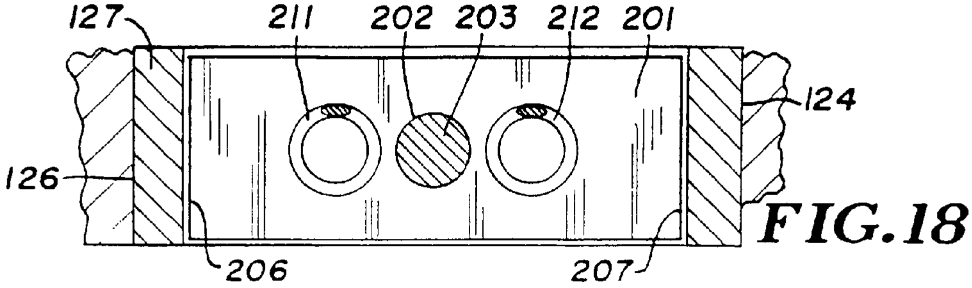
FIG. 18 is a sectional view taken along line 18-18 of FIG. 16.

As shown in FIGS. 16 to 18, bolts 128 and 129 secure the top of yoke 127 to diaphragm plate 106. An anti-lash assembly 200 bears against the flat top surface 209 of shuttle 134 to maintain the bottom surface 205 of shuttle 134 in sliding surface contact with flat surface 210 of yoke 127. Anti-lash assembly 200 compensates for manufacturing tolerances, thermal growth, and wear of shuttle surfaces 205 and 209 and adjacent yoke surfaces and maintains surfaces 205, 210 and 208, 209 in sliding contact to reduce stress and impact forces and inhibits vibrations and noise. A lash plate 201 has flat surface 208 located in sliding contact with shuttle flat surface 209. Plate 201 is a steel member having a central cylindrical hole 202 accommodating a cylindrical guide pin 203. Hole 202 can extend through plate 201. Pin 203 is press fitted or secured into a cylindrical bore 204 in the top of yoke 127. The lower end of pin 203 has a slip fit in hole 202 to allow lash plate 201 to move down to maintain surface engagement with the top surface 209 of shuttle 134. Opposite ends 206 and 207 of lash plate 201 are maintained spaced from adjacent inside walls of yoke 127 with pin 203. A pair of coil compression springs 211 and 212 bias lash plate 201 into continuous surface contact with the surface 209 of shuttle 134. Springs 211 and 212 located in cylindrical bores 213 and 214 in the top of yoke 127 extend downwardly into cylindrical recess 216 and 217 in lash plate 201. Other types of biasing members, such as elastic rubber or plastic cores, can be used for continuously biasing lash plate 201 down against shuttle 134.

Figure 14:
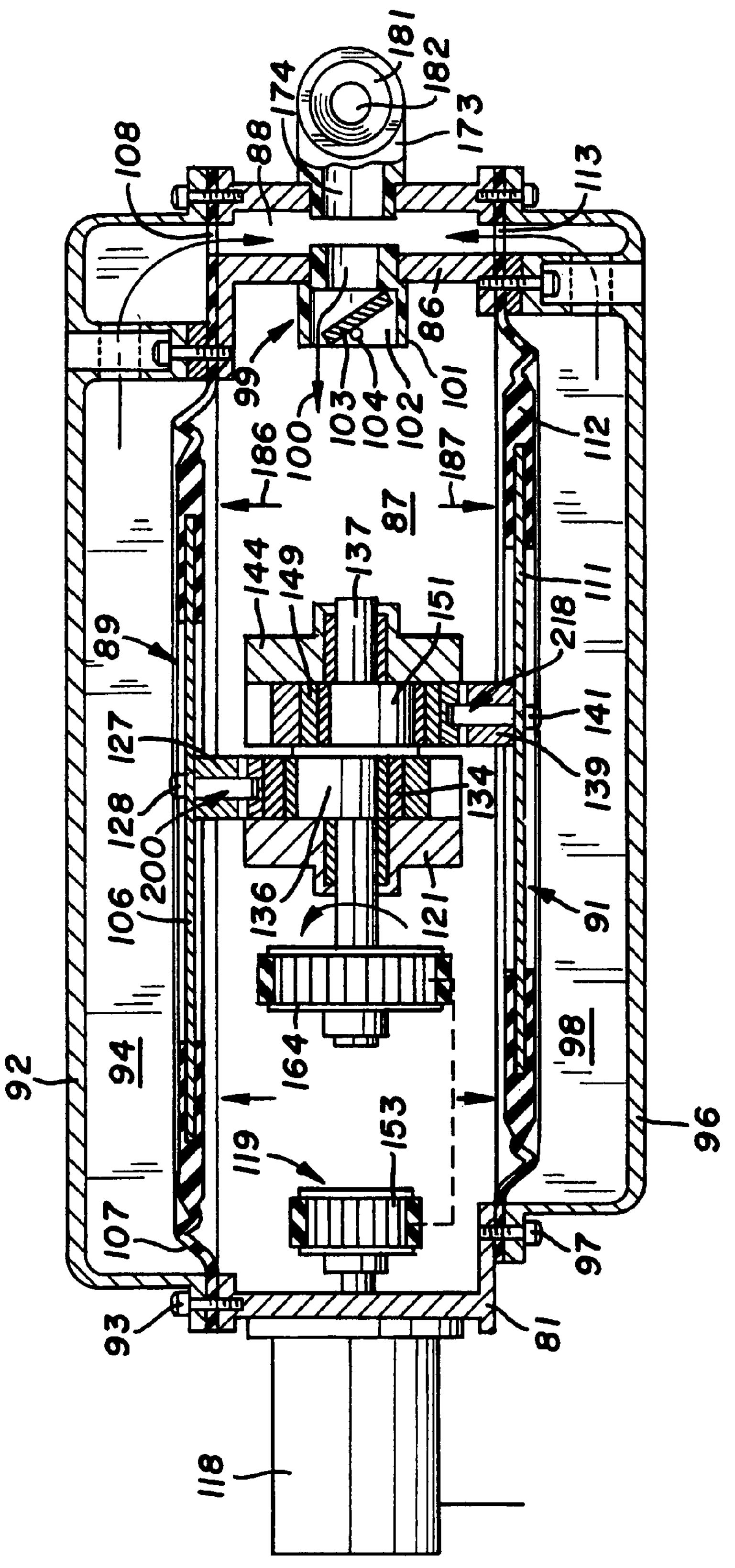
FIG. 14 is a sectional view similar to FIG. 8 showing the diaphragm assemblies in the air pumping mode.
Figure 15:
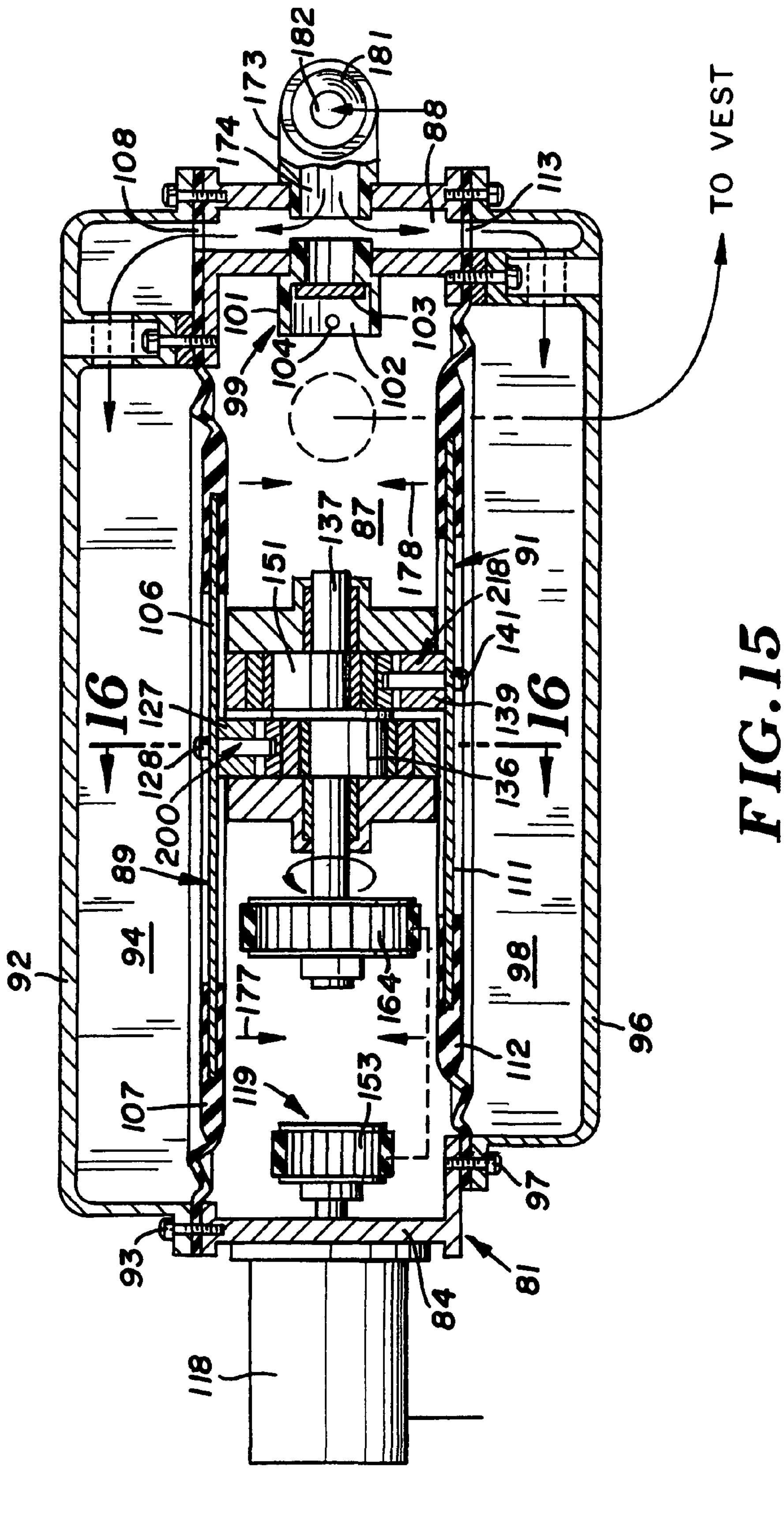
FIG. 15 is a sectional view similar to FIG. 8 showing the diaphragm assemblies in the air pulsing mode.

A second scotch yoke power transmission assembly operatively connected to plate 111 of diaphragm 91 comprises a yoke 139 secured with a pair of bolts 140 and 141 to plate 111. Bolts 140 and 141 prevent relative movement, including pivotal movement, of yoke 139 relative to plate 111 whereby diaphragm 91 has only linear reciprocating movements. Yoke 139 has outside upright sides located in sliding engagement with upright guide surfaces 142 and 143 of a second cross member 144 which restricts movement of yoke 139 to reciprocating linear movement. Returning to FIG. 11, fasteners 146 and 147 secure cross member 144 to casing side walls 82 and 83. Second cross member 144 is located adjacent first cross member 121 and rotatably accommodates the outer end of shaft 137, as shown in FIGS. 8, 14 and 15. Yoke 139 has an opening or window 148 slidably accommodating a slide block or shuttle 149 having a cylindrical bore for a roller bearing 152 and eccentric 151 secured to shaft 137. Eccentric 151 is located diametrically opposite eccentric 136, as shown in FIG. 14, so as to provide rotational balance to the scotch yoke power transmission assemblies.

An anti-lash assembly 218, shown in FIGS. 8, 12, 14 and 15, biases a lash plate into continuous surface engagement with shuttle 149 of the scotch yoke secured to diaphragm plate 111 with bolts 140 and 141. Anti-lash assembly 218 has the same structures and functions as anti-lash assembly shown in FIGS. 16 to 18.

Figure 6:
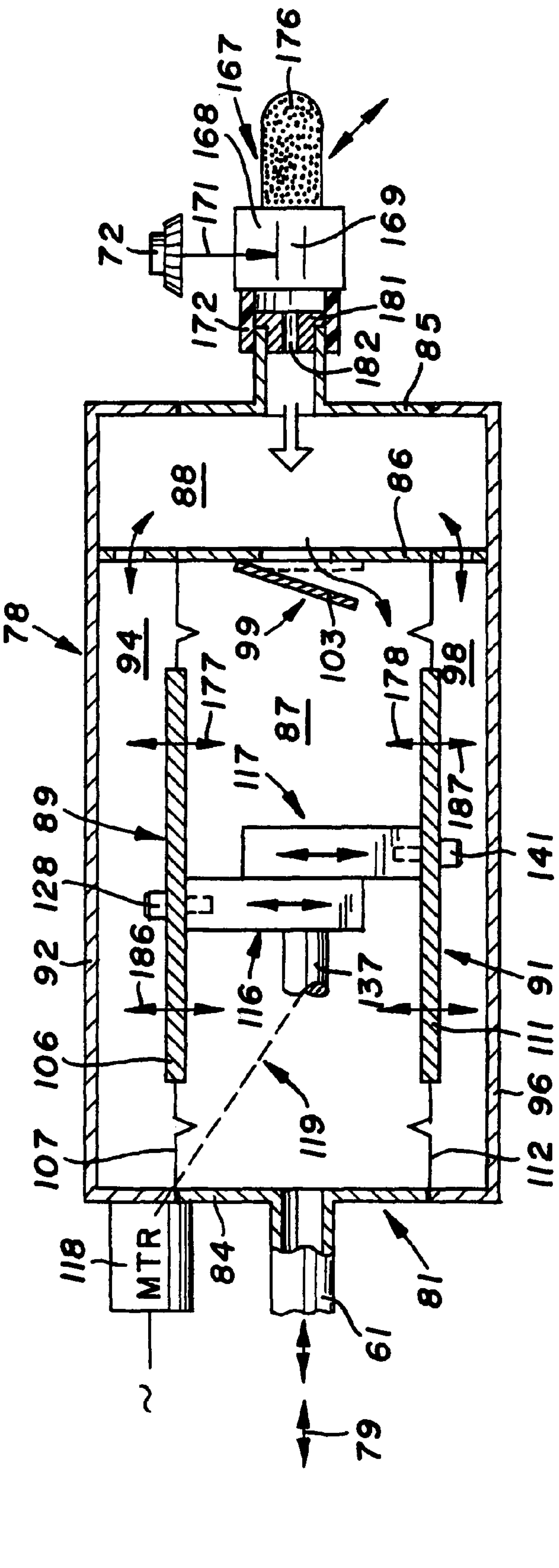
FIG. 6 is a cross-sectional diagrammatic view of the air pressure and pulse generator of FIG. 1.
Figure 7:
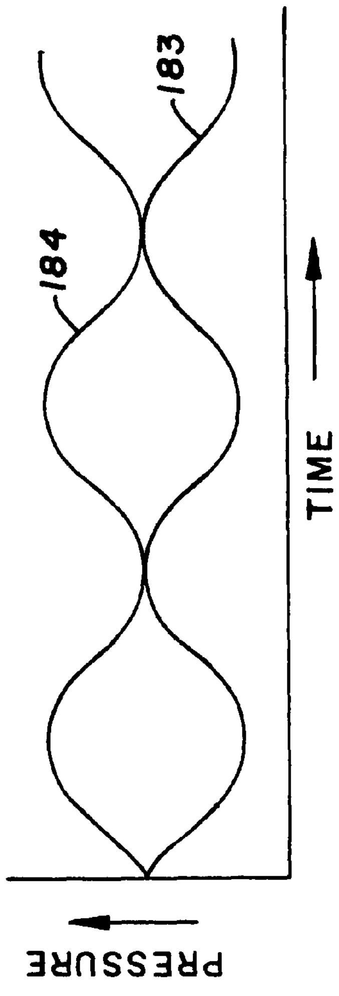
FIG. 7 is a pressure time graph of the air pressure and pulse generator of FIG. 1.

Returning to FIG. 11, belt and pulley power transmission 119 has a small drive pulley 153 connected to drive shaft 154 of motor 118. A first endless belt 156 located about pulley 153 and a large pulley 157 secured to a jack shaft 158 transmits power to shaft 137 with a small pulley 162 on jack shaft 158 and an endless belt 163 coupling pulley 162 to a large pulley 164 secured to shaft 137. The small and large pulleys 153, 157 and 162, 164 provide power transmission 119 with speed reduction operation of shaft 137. As shown in FIGS. 6, 8 and 11, motion transmission assemblies 116 and 117, and belt and pulley power transmission 119 are located in pulsing chamber 87 and are surrounded by casing 81 and diaphragms 89 and 91. The isolation of the motion transmission assemblies 116 and 117 in chamber 87 reduces noise and protects these assemblies and belt and pulley power transmission 119 from external environmental contaminates.

Figure 5:
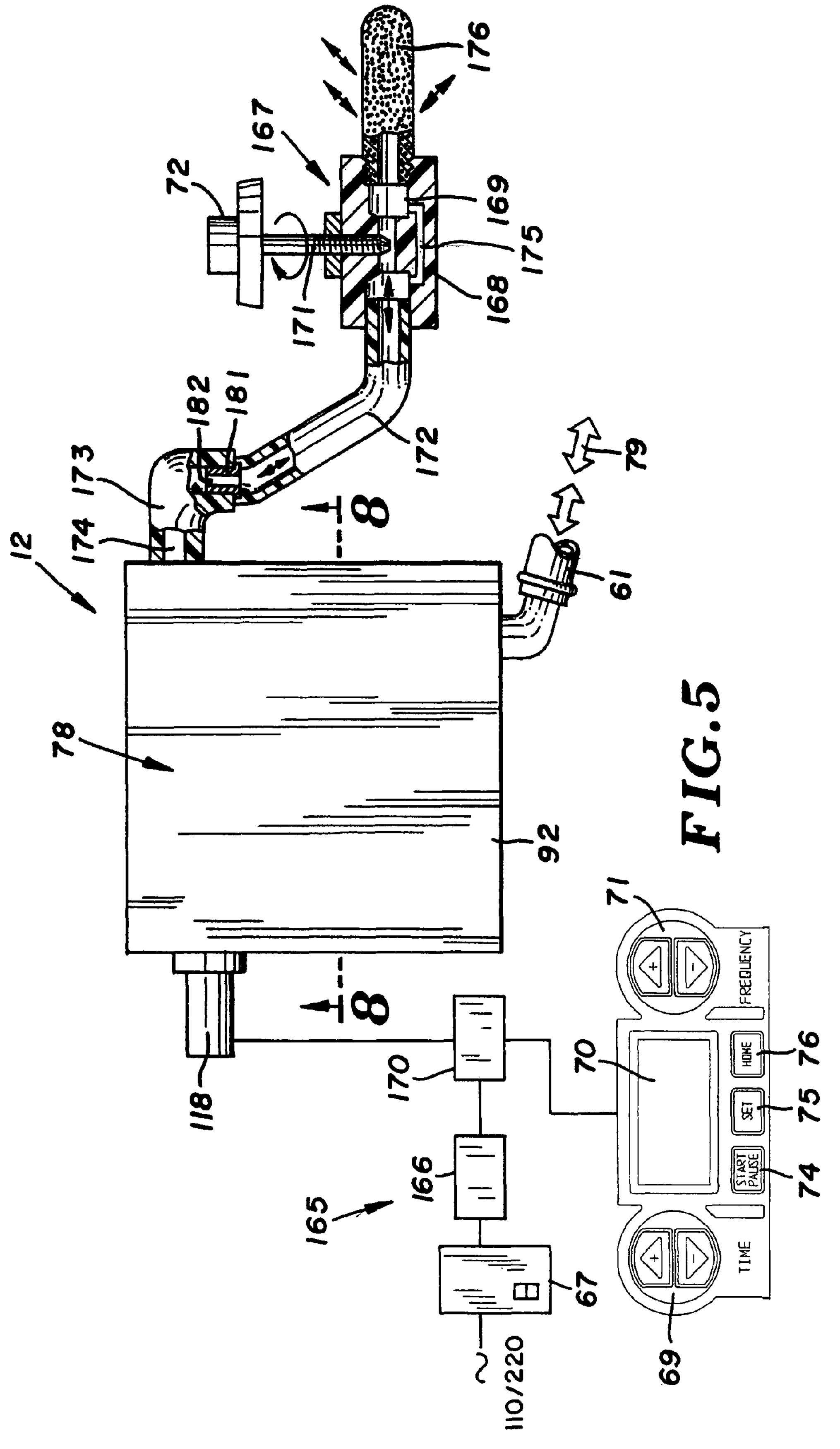
FIG. 5 is a diagrammatic view of the air pressure and pulsating apparatus of FIG. 1.

As shown in FIG. 5, a brushless electric dc motor 118 mounted on a side of air pulsator and pump unit 78 is wired to a programmable power supply 165 for controlling the time of operation of the unit and the frequency of the generated air pulses. Power supply 166 is adapted to be connected to either 110 volt 60 cycle or 220 volt 50 cycle power sources. A manually operated switch 67 connects the power source to a circuit board 166 operable to supply dc power to a digital controller 170 wired to motor 118 and control panel keys 69, 71, 74, 75 and 76 and screen 70. Controller 170 has programmable electronics including dynamic random access memory micro chips for controlling the operating time and speed of motor 118. Plus and minus time keys 69 are used to set the operation time of pulsator 12 between 0 and 30 minutes in 30 second intervals. Plus and minus frequency keys 71 are used to set the frequency of the air pulses by regulating the operating speed of motor 118 to adjust the pulse frequency between 5 and 25 pulses per second or Hz intervals. Manual and programmable data is displayed on screen 70 as hereinafter described.

The pressure of the air in manifold chamber 88 is controlled with a variable orifice proportional free-flow valve 167 operable to restrict or choke the flow of air into and out of manifold chamber 88. Valve 167 has a body 168 having a passage 169. An air flow restrictor 171, shown as a threaded member, mounted on body 168 and extended into passage 169 regulates the flow of air through passage 169 into a tube 172. Other types of air flow restrictors, such as a rotatable grooved ball or a movable disk, can be used to regulate air flow through valve 167. The remote end of tube 172 is connected to an elbow 173 mounted on casing wall 85. Elbow 173 has a passage 174 open to manifold chamber 88 to allow air to flow into manifold chamber 88. A passage 175 in body 168 allows a limited amount of air to flow into passage 174 into manifold 88. Passage 175 is a fixed air flow passage in body 168 that allows air to by-pass air flow restrictor 171 in user controlled variable air flow passage 169 so that the minimum treatment will not go down to zero. A cylindrical porous member 176 mounted on body 168 filters and allows air to flow into and out of passage 169 and attenuates noise of air flowing through passage 169. Knob 72 is mechanically connected to restrictor 171 whereby rotation of knob 72 changes the restriction size of the air flow passage 169 and the rate of flow of air through passage 169. The rate of air flow through passage 169 controls the volume of air that flows into and out of manifold chamber 88. The volume of air in manifold chamber 88 and pumping chambers 94 and 98 is proportional to the pressure of the air in manifold chamber 88 generated by linear lateral movements of diaphragms 89 and 91, shown by arrows 177 and 178 in FIG. 6. The adjustment of valve 167 regulates the pressure of the air in manifold chamber 88, shown at 183 in FIG. 7. The air pressure in manifold chamber 88 follows a sine wave due to the harmonic linear reciprocating motion of diaphragms 89 and 91. The pressure of the air in pulsing chamber 87, shown at 184, has a sine wave opposite the sine wave of air pressure 183. When the air pressure in manifold chamber 88 exceeds the air pressure in pulsing chamber 87, air flows from manifold chamber 88, through one-way valve 99 into pulsing chamber 87 and from pulsing chamber into the air chamber 37 of air core 36.

As shown in FIGS. 5 and 6, an air flow control member 181 having a longitudinal passage 182 is mounted on the air inlet side of elbow 173. Member 181 modulates the air flow into and out of manifold chamber 88 to compensate for variations in air flow in tube 172, valve 167 and porous member 176.

Figure 19:
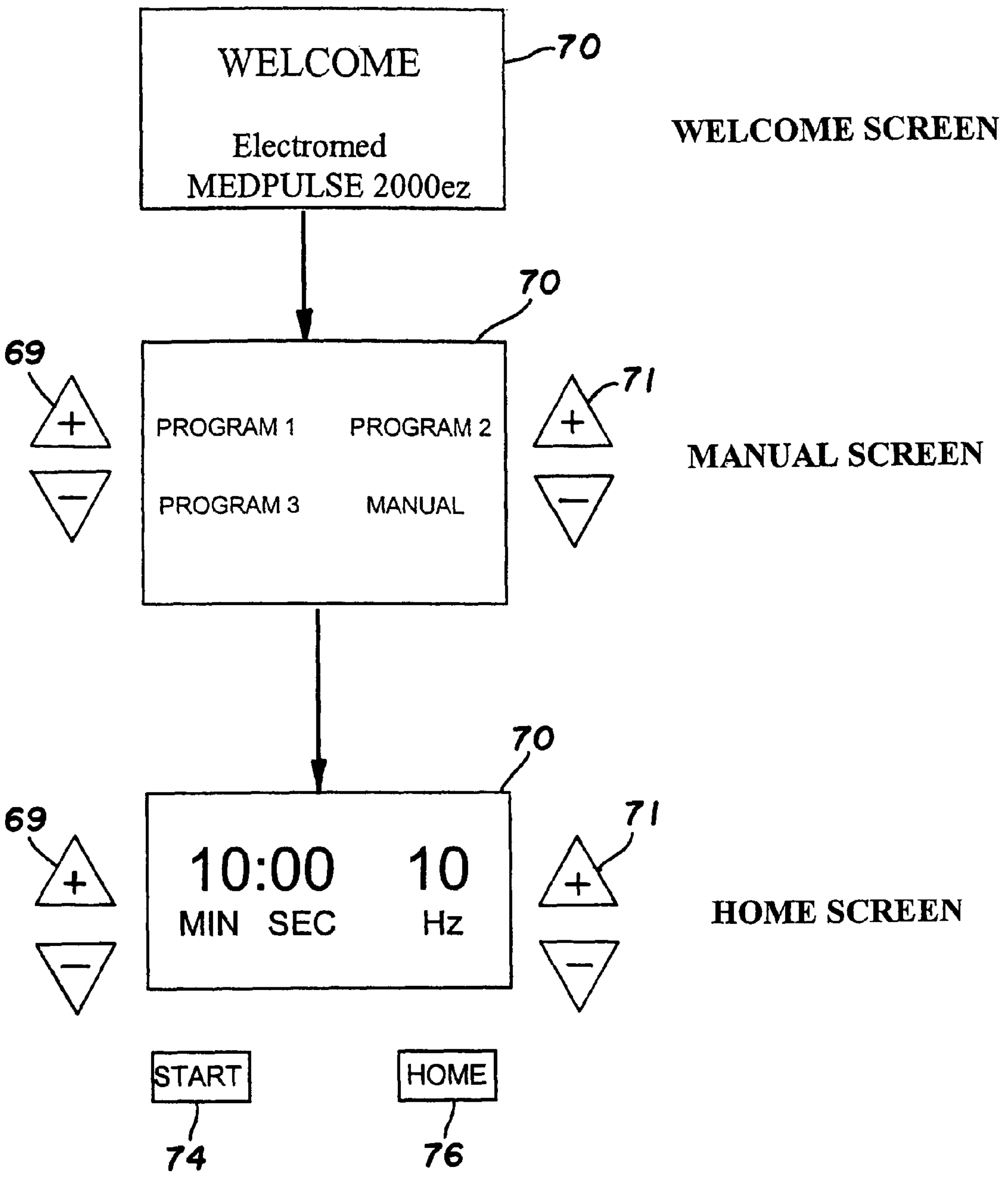
FIG. 19 is a diagram of the manual sequence of the operation of the time and frequency controls of the generator.

In use, vest 11 is placed about the person's upper body or chest 14, as shown in FIGS. 1 and 2. Shoulder straps 43 and 44 connected to loop pads 48 and 49 vertically support vest 11 on person 13. The circumferential portion of vest 11 around body 14 is maintained in a comfortable snug fit with releasable connectors 52 and 54. Air pressure and pulse generator 12 is connected to the air core 36 within vest 11 with flexible tube 61. The remote end of tube 61 is connected to the air inlet end 60 of air manifold passage 38 of air core 36. Person 13 or the care person sets knob 72 to select the air pressure within air core 36. Manual operation of the air pressure and pulse generator 12 is selectively controlled by the user or another person. Power switch 67 is turned ON to power up the generator. As shown in FIG. 19, the WELCOME screen 70 will display WELCOME for 5 seconds and then automatically advance to HOME screen 70 displaying PROGRAMS 1-3 and MANUAL modes of operation. If no inputs are received the screen falls to the MANUAL screen which displays 10 minutes and 10 Hz. The user may press the switch associated with the word "MANUAL" on the display to advance to the MANUAL screen without waiting. Time operation can be reset in 30 second increments through a range from 30 seconds to 30 minutes with the use of the plus or minus keys 69. Frequency is set in 1 Hz increments through the range from 5 to 20 Hz with the use of plus or minus keys 71. Increment rate of time and frequency changes begin at a slow scroll rate of 0.5 seconds per increment for the first 5 increments and then a fast scroll rate of 0.25 seconds per increment. Actuation of the START key 74 begins running the generator and stores the time and frequency settings for later reset uses. Actuation of the HOME key 76 returns to HOME screen.

Figure 20:
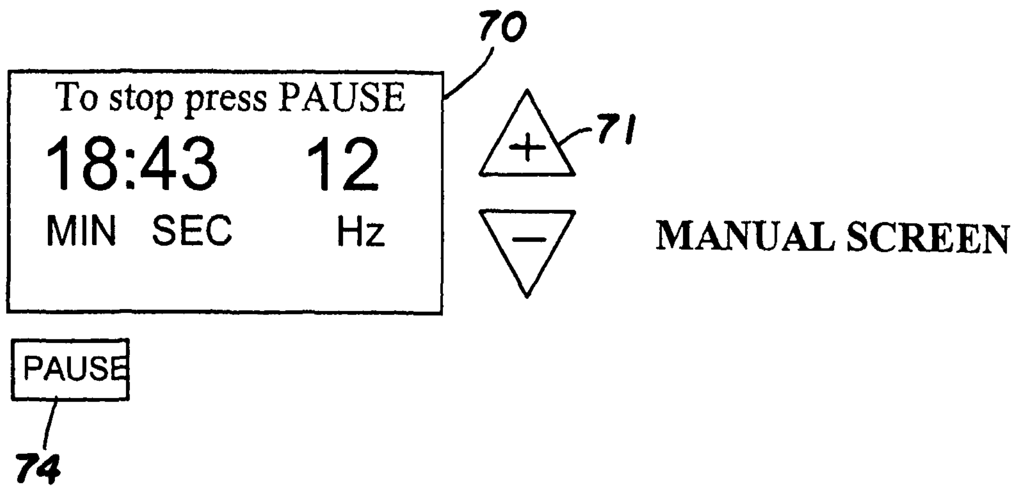
FIG. 20 is a diagram of the time count down screen during manual operation of the generator.
Figure 21:
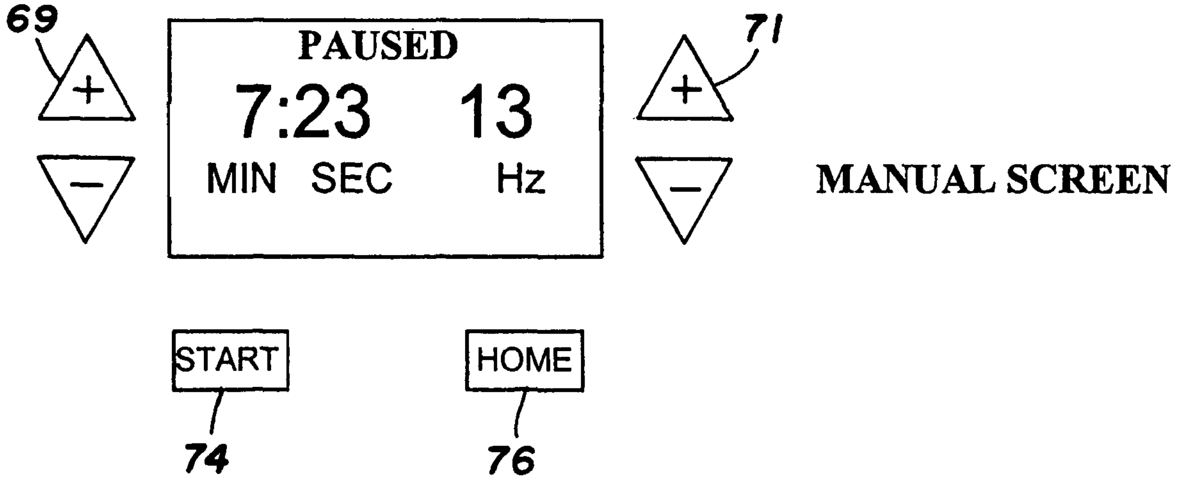
FIG. 21 is a diagram of the screen during paused manual operation of the generator.

During the running of generator 12 the MANUAL screen displays the count down time in one second increments as shown in FIG. 20. Time cannot be reset while the generator 12 is running. Frequency can be reset in 1 Hz increments through the range from 5 to 20 Hz whether running or paused. The MANUAL screen 70 also displays the message TO STOP PRESS PAUSE while the generator is running. Pressing PAUSE key stops running the generator 12 and freezes the time display with the time remaining shown. The MANUAL screen displays PAUSED and remaining time and set Hz as shown in FIG. 21. Actuation of the START key 74 resumes running the generator 12 at the displayed time and frequency settings. After timing out to 00:00, generator 12 shuts off, sounds two beeps, and displays 00:00 for 5 seconds before re-displaying the last settings that were utilized and stored as described herein.

Figure 22:
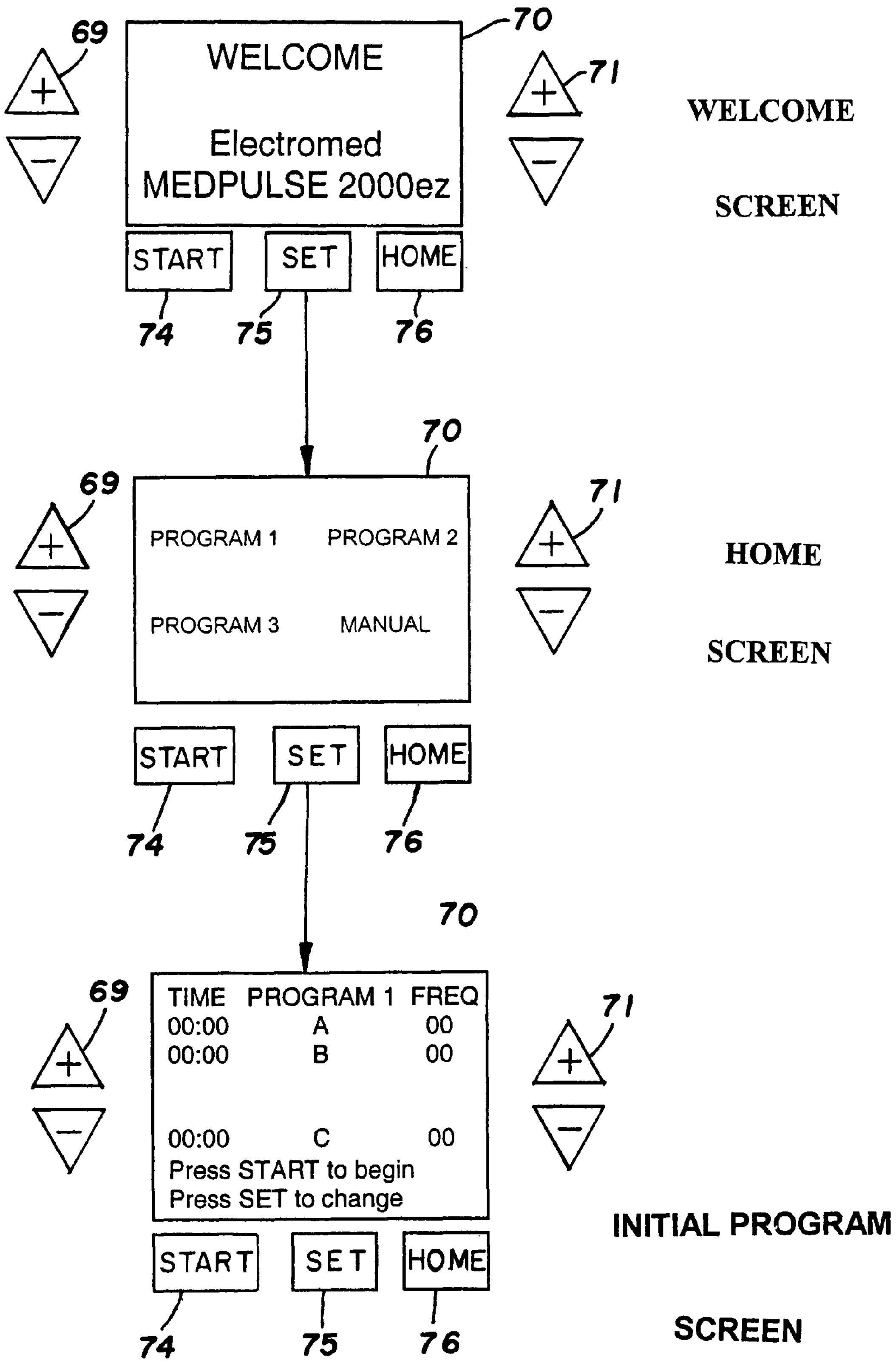
FIG. 22 is a diagram of the program sequence of the operation of the time and frequency controls of the generator.

The program mode of air pressure and pulse generator 12 allows a user or caregiver to set three separate protocols, PROGRAMS 1, 2 or 3, that can be used each time a treatment is performed. This allows multiple users to save individual prescriptions or one user to set three different treatment protocols. Presetting treatment protocols prescribed by a physician into generator 12 permanently saves treatment settings which allows simple one-touch user control of treatments. Young children will not be able to skip portions of treatment. Older persons will not need to be attentive to the protocol thereby allowing other tasks, such as reading or computer work. Referring to FIG. 22, there is shown the sequence to set PROGRAM 1. When switch 67 is turned ON screen 70 will display WELCOME for 5 seconds and then change to HOME screen for 10 seconds. If no input is received or MANUAL display lower right key 71 is touched, screen 70 falls to MANUAL screen. Pressing the time or frequency key next to PROGRAM 1, PROGRAM 2, or PROGRAM 3 during the 10 second input period flows control to INITIAL PROGRAM screen. Upon arriving at this screen, the top line will display the selected program number, shown as PROGRAM 1. This program number, for example PROGRAM 1, will remain until the user has chosen whether to execute or reset the program. SET key 75 is then pressed to begin presetting the prescribed protocol. START key 74 is pressed to execute a previously existing program. HOME key 76 is actuated to return to the HOME screen.

The time and frequency data can be changed when SET key 75 is actuated. The program for treatment sequences begins with line A which is highlighted reverse video across the entire line A. Time keys 69 are used to reset in 30 second increments through the range from 00:00 to 30:00 minutes. Frequency keys 76 are used to set the frequency in 1 Hz increments through the range from 5 to 25 Hz. Pressing SET key 69 stores the displayed values for time and frequency for line A and scrolls to line B. If the user does not want to change time or frequency of line B, pressing SET key 75 will scroll to line C. The time and frequency values for lines B, C, D, E. or F can be changed with the use of time key 69 and frequency key 71. Pressing SET key 75 from the last line reverts to line A and looping through all the lines until START key 74 or HOME key 76 is pressed. Pressing START key 74 at any time begins running generator 12. PROGRAM 2 and PROGRAM 3 are changed according to the method described with respect to PROGRAM 1.

Figure 23:
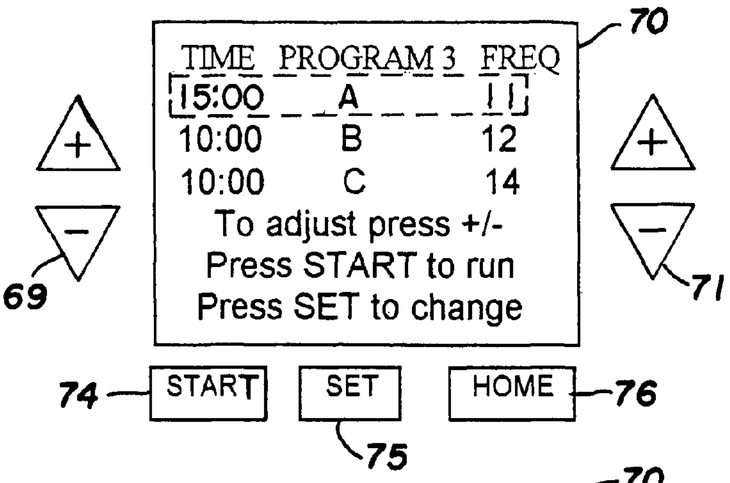
FIGS. 23 to 26 are diagrams of an alternative program sequence of the operation of the time and frequency controls of the generator.
Figure 24:
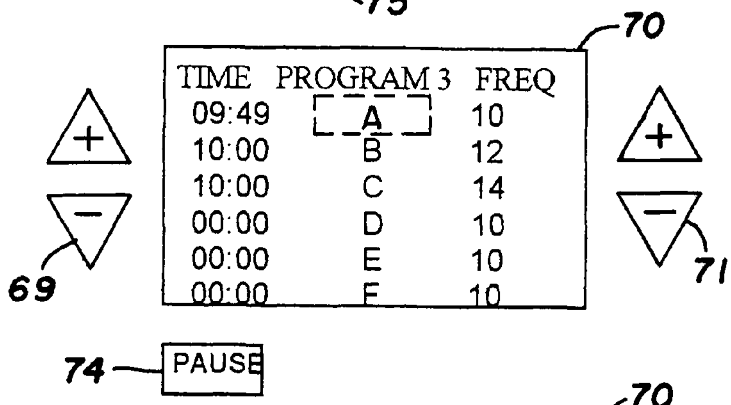
Figure 25:
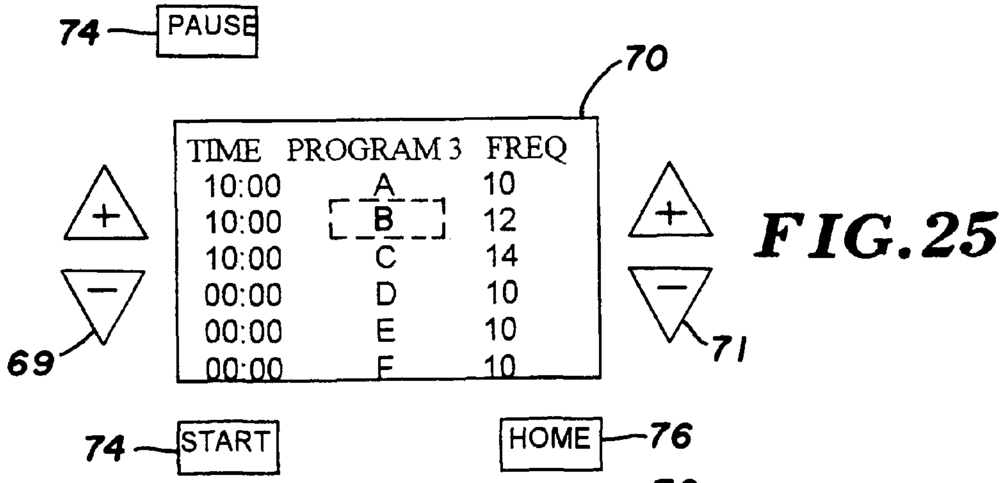
Figure 26:
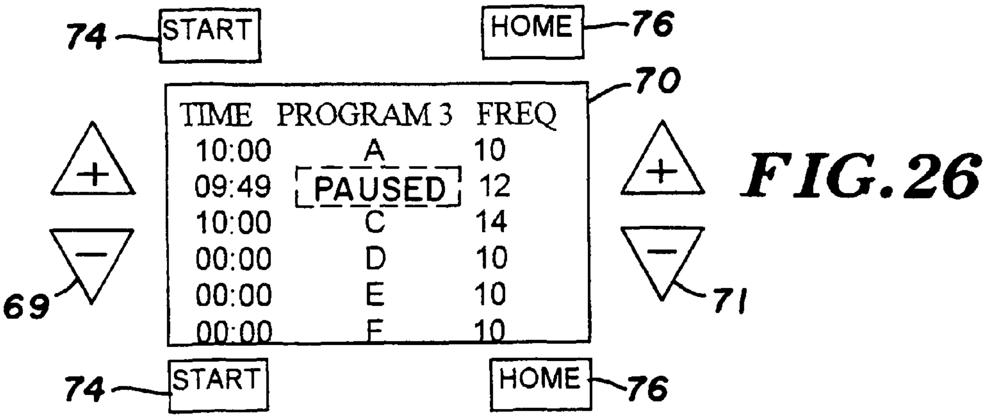

FIGS. 23 to 26 diagram the user interface for a different program, identified as PROGRAM 3. The HOME screen is used to activate PROGRAM 3. The HOME screen is used to activate PROGRAM 3. The SET control 75 is used to program the treatment sequences, beginning with line A. The line that is active for changing values is displayed with highlighting reverse video across the entire line as shown in FIG. 23. Time can be re-set in 30 second increments through the range from 00:00 to 30:00 minutes with time control keys 69. Frequency is set in 1 Hz increments through the range from 5 to 20 Hz with frequency control keys 71. The increment rate of time and frequency changes begins at a slow scroll rate of 0.5 seconds per increment for the first five increments and then a fast scroll rate of 0.25 seconds per increment. Pressing START at any time begins running generator 12. Pressing SET stores the displayed values for time and frequency for the displayed line and scrolls to the next line. If the user does not want to change time or frequency, pressing SET will scroll to the next line. Pressing SET from the last line reverts to line A and loops A through F until START or HOME is pressed. Pressing HOME at any time returns to HOME screen shown in FIG. 19. Pressing START begins to execute the displayed program. The execution of the program will immediately scroll past any lines whose time entry is 00:00. Time and frequency values cannot be changed at any time in the execution mode whether running or paused. The remaining time value is displayed while running and continuously counting down. The user can press PAUSE any time that generator 12 is running, causing generator 12 to stop and display the word PAUSED, as shown in FIG. 26, in place of the line letter. The remaining time is displayed while paused. When generator 12 is running, HOME is an inactive button. Generator 12 stops and beeps twice when the timer runs down to 00:00. When generator 12 stops the message TREATMENT COMPLETE displays on screen 70. The display then scrolls up to the WELCOME screen shown in FIG. 22. Generator 12 is ready for new START, SET or HOME instructions.

The user or caregiver can test the operations of generator 12 regarding accumulated run time, test with vest, test without vest and motor temperature limits. The accumulated run time is displayed on screen 70 by pressing and hold SET key 75 during any display of the HOME screen. The accumulated run time is displayed in 4-digit hours as long as SET key 75 is pressed. Pressing and holding HOME key 76 before and during power-up causes the system to wake-up in the test operations mode, initially in the test with vest screen. START key 74 is pressed to begin the test. Air pressure knob 72 is set on 50. If the specified air pressure is achieved the system has passed the test. When the specified air pressure is not reached the second test without the vest is conducted. The vest end of hose 61 is plugged and the pressure adjusted to 10. The test begins by pushing START key 75. If the specified pressure is reached the vest needs service. In the event that the specified pressure is not reached, the system needs service. HOME key 76 is pressed to skip the test. Motor 118 is prevented from starting while any motor operating temperature limit is outside the allowable limits of motor too hot or motor too cold. The motor operating temperature limits are factory set with the low temperature limit of 50 degrees F. and the high temperature limit of 200 degrees F. The motor operating temperature limits can be factory adjusted to other low and high temperatures.

An alternative mode of operation of generator 12 has a random program in addition to the manual and programmed modes of operation described herein. The random program has a frequency between 5 and 25 Hz without a definite pattern during a set time period. The controller 170 has memory electronic components that randomly alter the speed of motor 118 thereby changing the frequency of the air pulses and pressure pulses subjected to a person's body. The changes in pressure pulses mitigate wearisome uniformity and monotony.

As shown in FIGS. 6, 8, 11, 14 and 15, motor 118 through power transmission 119 rotates shaft 137 and turns eccentrics 136 and 151 about the axis of shaft 137. Eccentrics 136 and 151 laterally move slide blocks or shuttles 134 and 149 relative to yokes 127 and 139 and linearly reciprocate yokes 127 and 139. Diaphragms 89 and 91 directed secured with bolts 128, 129, 140 and 141 to yokes 127 and 139 are linearly moved outwardly, shown by arrows 186 and 187 in FIGS. 12, 13 and 15, and inwardly, shown by arrows 117 and 178 in FIGS. 6 and 15. The anti-lash assemblies 200 and 218 associated with the scotch yoke motion transmission mechanisms eliminate vertical movements of shuttles 134, 149 relative to yokes 127, 139 to inhibit vibrations and noise. As shown in FIG. 15, when diaphragms 89 and 91 are linearly moved inwardly toward each other air flows from manifold chamber 88 into pumping chamber 94 and 98. A restricted amount of air flows through valve 167 and air flow control member 181 into manifold chamber 88. Knob 72 is adjusted to control air flow through valve 167 thereby control the amount and pressure of air in manifold chamber 88. Inward movement of diaphragms 89 and 91 increase the pressure of air in pulsing chamber 87 closing one-way valve 99 and transferring air under pressure through hose 61 to air core 36. Air core 36 expands inwardly to retain flexible liner 32 of vest 11 in firm engagement with the chest and back of person 13. Linear inward and outward movements of diaphragms 89 and 91 generate air pressure pulses in chamber 87 and air core 36 which applies repetitive forces, shown by arrows 18, to the chest and back of person 13 to simultaneously apply high frequency oscillation therapy to all lobes of the lungs and airway passages to enhance removal of mucus, secretions, and like materials therefrom.

Figure 12:
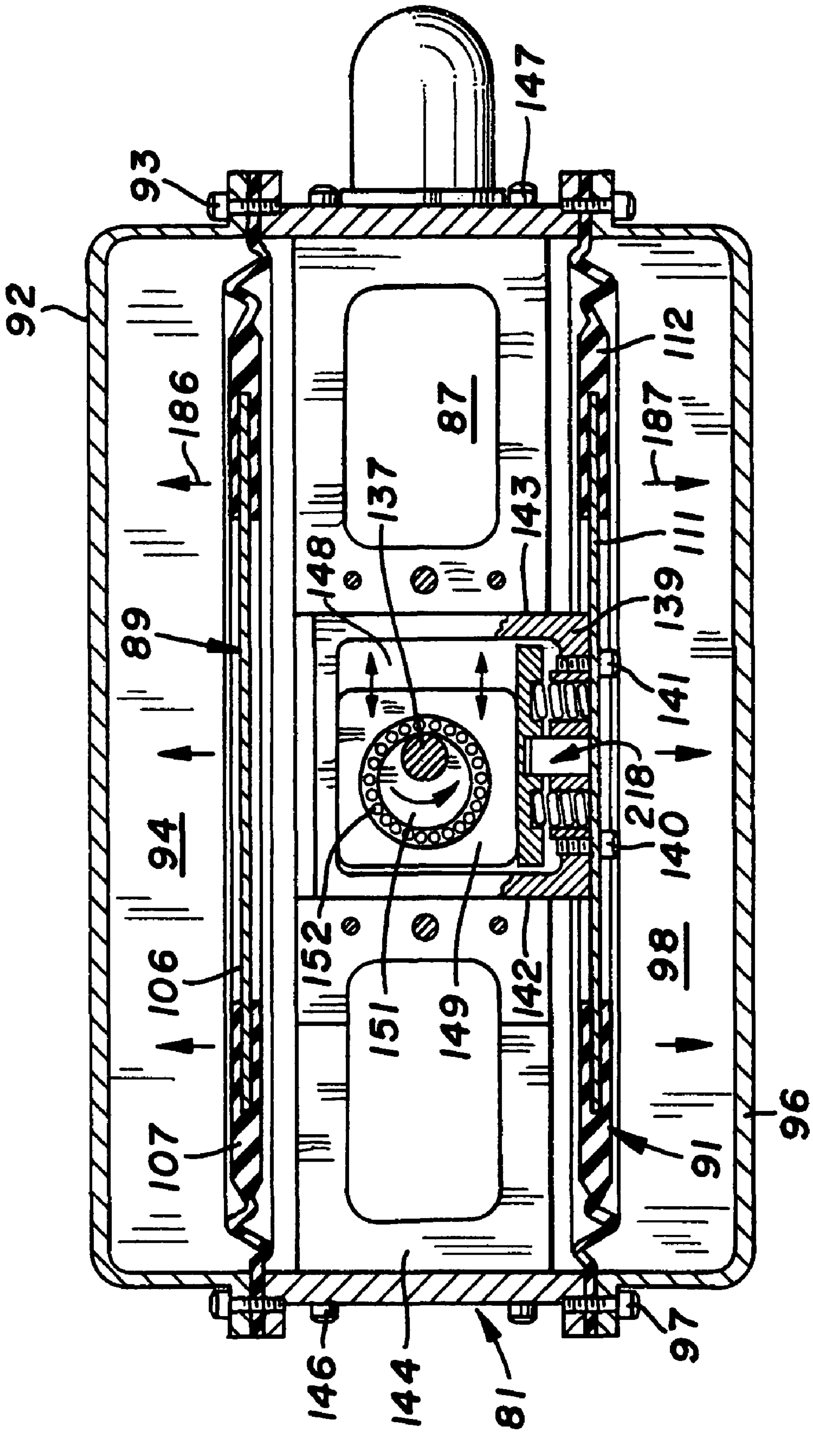
FIG. 12 is a sectional view taken along line 12-12 of FIG. 11.

As shown in FIGS. 12 to 14, outward linear movements of diaphragms 89 and 91 force air out of pumping chambers into manifold chamber 88 thereby increasing the pressure of the air in manifold chamber 88. When the pressure of the air in manifold chamber 88 exceeds the pressure of the air in pumping chamber 87, one-way valve 99 opens to allow air to flow from manifold chamber 88 into pulsing chamber 87, shown by arrow 100 in FIG. 14, thereby increasing the pressure of the air in pulsing chamber 87 and air core 36. One-way valve 99 closes in response to a drop in air pressure in manifold chamber 88 and prevents back flow of air from pulsing chamber 87 into manifold chamber 88. The size of passage 182 limits the amount of air that can flow into manifold chamber 88 thereby preventing excess pressure of air in manifold chamber 88 in the event that valve 167 becomes inoperative. Hole 175 in valve body 168 allows a limited amount of air to flow into and out of manifold chamber 88 to maintain a minimum pressure of air in pulsing chamber 87 and air core 36 in the event that valve 167 is closed.

Diaphragms 89 and 91 when linearly moved in opposite directions by the linear motion transmission assemblies 116 and 117 repetitively perform the dual functions of establishing air pressure and pulsing the air in pulsing chamber 87 and air core 36. The frequency of air pulses is controlled between 5 and 25 cycles per second by varying the speed of brushless dc motor 118. Control panel keys 71 used by person 13 or the caregiver to program the speed of motor 118 to change the pulse frequency of the air pulses in pulsing chamber 87 and air core 36. Duration of operation of pulsator 12 is programmed with time keys 69. The valve 167 restricts the flow of air into and out of manifold chamber 88 to regulate the pressure of the air in manifold chamber 88 which is transferred through check valve 99 to pulsing chamber 87 responsive to the linear movements of diaphragms 89 and 91.

Hose 61 directs air under pressure and air pulses to air manifold passage 38 in the bottom of air core 36. An elongated coiled spring 41 within air core 36 maintains passage 38 open to allow air to flow through openings 39 upwardly into air chamber 37. The air pulsing in chamber 37 applies inwardly and upwardly directed pulsing forces to the person's rib cage 27 which transfers the pulsing forces to the lungs and airway passages. The outer cover 31 of vest 11 being non-elastic material limits outward expansion of air core 36. Outer cover 31 extended around the lower portion of air core 36 containing coil spring 36 limits inward pressure of air core 36 on the person's abdomen. The frequency of the pulses range from 5 to 25 cycles per second. The pulse forces loosen mucus and secretions from the lungs and airway passages toward the mouth where they can be removed by normal coughing. Air core 36 has a plurality of small openings or holes 42 which allow limited amounts of air to flow out of chamber 37 into vest 11. The air ventilates and cools the upper body 14 surrounded by vest 11 and deflates air core 36 when air pressure and pulse generator 12 is turned OFF.

The body pulsating apparatus and method has been described as applicable to persons having cystic fibrosis. The body pulsating apparatus and method is applicable to bronchiectasis persons, post-surgical atelectasis, and stage neuromuscular disease, ventilator dependent patients experiencing frequent pneumonias, and persons with reduced mobility or poor tolerance of Trendelenburg positioning. Person with secretion clearance problems arising from a broad range of diseases and conditions are candidates for therapy using the body pulsating apparatus and method of the invention.

The present disclosure is a preferred embodiment of the body pulsating apparatus and method. It is understood that the body pulsating apparatus is not to be limited to the specific materials, constructions, arrangements and method of operation shown and described. It is understood that changes in parts, materials, arrangement and locations of structures may be made without departing from the invention.

The invention claimed is:

1. A scotch yoke motion transmission comprising:

a member having laterally spaced substantially parallel guide first surfaces, a yoke slideably mounted on said guide first surfaces for movement along said guide first surfaces, said yoke having an opening, a second surface perpendicular to said guide first surfaces facing said opening, and a third surface parallel to the second surface, a shuttle located in said opening in sliding engagement with said second surface of the yoke, an anti-lash assembly mounted on the yoke and engageable with the third surface of the yoke and engageable with the shuttle to retain the shuttle in continuous sliding engagement with the second surface of the yoke, said anti-lash assembly including a plate located in engagement with the shuttle, at least one biasing member mounted on the yoke and engageable with the lash plate to bias the plate in engagement with the shuttle and maintain the second surface of the shuttle in continuous engagement with the second surface of the yoke, a guide mounted on the yoke engageable with the plate to retain the plate in assembled relation with the yoke and shuttle, said guide comprising a cylindrical pin secured to the yoke extended into a hole in the plate, an eccentric rotatably mounted on the shuttle, and a drive mechanism to turn the eccentric in a circular path to move the shuttle relative to the yoke and move the yoke along the guide first surfaces of the member.

2. The scotch yoke motion transmission of claim 1 wherein: the biasing member comprises a pair of coil springs.

3. The scotch yoke motion transmission of claim 2 wherein: the yoke has bores accommodating first end portions of the coil springs and the plate has recesses accommodating second end portions of the coil springs.

4. The scotch yoke motion transmission of claim 1 wherein: the plate has opposite ends spaced from the yoke.

5. A scotch yoke motion transmission comprising:

a first member having laterally spaced substantially parallel first surfaces, a yoke having linear second surfaces on the opposite sides thereof, said linear second surfaces being slideably engageable on said first surfaces to allow movement of the yoke along said first surfaces of the first member, said yoke having an internal opening and a third surface perpendicular to said first surface facing said opening, a shuttle located in said opening having a shuttle surface located in sliding engagement on said third surface of the yoke and a cylindrical bore, an anti-lash assembly mounted on the yoke and engageable with the shuttle to retain the shuttle surface in continuous sliding engagement with the third surface of the yoke, said anti-lash assembly including a member located in sliding engagement with the shuttle at least one biasing member mounted on the yoke and engageable with the member to bias the member in engagement with the shuttle and maintain the shuttle surface of the shuttle in continuous engagement with the second surface of the yoke, a guide mounted on the yoke engageable with the member to retain the member in assembled relation with the yoke and shuttle, said guide comprising a cylindrical pin secured to the yoke extended into a hole in the member, and an eccentric located within the cylindrical bore of the shuttle connectable to a drive mechanism operable to turn the eccentric in a circular path to move the shuttle relative to the yoke and move the yoke along said first surfaces of the first member.

6. The scotch yoke motion transmission of claim 5 wherein: the biasing member comprises a pair of coil springs.

7. The scotch yoke motion transmission of claim 6 wherein: the yoke has bores accommodating first end portions of the coil springs and the member has recesses accommodating second end portions of the coil springs.

8. The scotch yoke motion transmission of claim 5 wherein: the member has opposite ends spaced from the yoke.

9. A scotch yoke motion transmission comprising:

a first member having laterally spaced flat and parallel first surfaces, a yoke having flat and parallel second surfaces on opposite sides thereof, said second surfaces being slideably engageable on said first surfaces to allow movement of the yoke along said first surfaces of the first member, said yoke having an internal opening and a third surface perpendicular to said first surface facing the opening, a shuttle located in said opening having a flat first shuttle surface perpendicular to said first surface located in sliding engagement on said third surface of the yoke and a cylindrical bore, and a flat second shuttle surface parallel to the first shuttle surface, an anti-lash assembly mounted on the yoke and engageable with said second shuttle surface to retain the first shuttle surface in continuous sliding engagement with the third surface of the yoke, said anti-lash assembly including a plate located in engagement with the second shuttle surface biasing members mounted on the yoke engageable with the plate to retain the plate in engagement with the second shuttle surface and the first shuttle surface in continuous engagement with the third surface of the yoke, a guide mounted on the yoke engageable with the plate to retain the plate in assembled relation with the yoke and shuttle, said guide comprising a cylindrical pin secured to the yoke extended into a hole in the plate, and an eccentric located in the cylindrical bore of the shuttle connectable to a drive mechanism operable to turn the eccentric in a circular path to move the shuttle relative to the yoke and move the yoke along said first surfaces of the first member.

10. The scotch yoke motion transmission of claim 9 wherein: the biasing members include a pair of coil springs.

11. The scotch yoke motion transmission of claim 10 wherein: the yoke has bores accommodating first end portions of the coil springs and the plate has recesses accommodating second end portions of the coil springs.

12. The scotch yoke motion transmission of claim 9 wherein: the plate has opposite ends spaced from the yoke.

13. A scotch yoke motion transmission comprising:

a first member having laterally spaced flat and parallel first surfaces, a yoke having flat and parallel second surfaces on opposite sides thereof, said second surfaces being slideably engageable on said first surfaces to allow movement of the yoke along said first surfaces of the first member, said yoke having an internal opening and a third surface perpendicular to said first surface facing the opening, a shuttle located in said opening having a flat first shuttle surface perpendicular to said first surface located in sliding engagement on said third surface of the yoke and a cylindrical bore, and a flat second shuttle surface parallel to the first shuttle surface, an anti-lash assembly mounted on the yoke and engageable with said second shuttle surface to retain the first shuttle surface in continuous sliding engagement with the third surface of the yoke, an eccentric located in the cylindrical bore of the shuttle connectable to a drive mechanism operable to turn the eccentric in a circular path to move the shuttle relative to the yoke and move the yoke along said first surfaces of the first member, said anti-lash assembly including a flat plate located in surface engagement with the second shuttle surface, a pair of laterally spaced biasing members mounted on the yoke and engageable with the plate to bias the plate in surface engagement with the second shuttle surfaces and maintain the first shuttle surface in continuous surface engagement with the third surface of the yoke, and a guide pin mounted on the yoke between the biasing members engageable with the plate to retain the plate in assembled relation with the yoke and shuttle.

14. The scotch yoke motion transmission of claim 13 wherein:

the biasing members are coil springs, said yoke has bores accommodating first end portions of the coil springs, and said plate has recesses accommodating second end portions of the coil springs.

* * * * *